(12) United States Patent
Kang et al.

(10) Patent No.: US 11,646,022 B2
(45) Date of Patent: May 9, 2023

(54) ELECTRONIC DEVICE FOR CHATTING WITH CHATBOT AND OPERATION METHOD THEREOF

(71) Applicant: Samsung Electronics Co., Ltd., Gyeonggi-do (KR)

(72) Inventors: Sang Wook Kang, Gyeonggi-do (KR); Young Hoon Kim, Gyeonggi-do (KR); Seung Hoon Park, Gyeonggi-do (KR); Da Som Lee, Gyeonggi-do (KR); Seong Min Je, Gyeonggi-do (KR)

(73) Assignee: Samsung Electronics Co., Ltd

( * ) Notice: Subject to any disclaimer, the term of this patent is extended or adjusted under 35 U.S.C. 154(b) by 297 days.

(21) Appl. No.: 16/965,751

(22) PCT Filed: Nov. 8, 2018

(86) PCT No.: PCT/KR2018/013543
§ 371 (c)(1),
(2) Date: Jul. 29, 2020

(87) PCT Pub. No.: WO2019/156314
PCT Pub. Date: Aug. 15, 2019

(65) Prior Publication Data
US 2021/0035576 A1 Feb. 4, 2021

(30) Foreign Application Priority Data
Feb. 7, 2018 (KR) .................. 10-2018-0015069

(51) Int. Cl.
*G10L 15/22* (2006.01)
*G10L 15/183* (2013.01)

(52) U.S. Cl.
CPC ............ *G10L 15/22* (2013.01); *G10L 15/183* (2013.01)

(58) Field of Classification Search
None
See application file for complete search history.

(56) References Cited

U.S. PATENT DOCUMENTS 10,127,227 B1 * 11/2018 Badr .................. G06F 16/3329
10,445,725 B2 * 10/2019 Tietzen ............... G06Q 20/405
(Continued)

FOREIGN PATENT DOCUMENTS

| JP | 2013059856 | 4/2013 |
|----|-----------|--------|
| JP | 2017169839 | 9/2017 |

(Continued)

OTHER PUBLICATIONS

PCT/ISA/210 Search Report issued on PCT/KR2018/013543, dated Feb. 14, 2019, pp. 7.

(Continued)

*Primary Examiner* — Seong-Ah A Shin
(74) *Attorney, Agent, or Firm* — The Farrell Law Firm, P.C.

(57) ABSTRACT

A system according to various embodiments may comprise: a first electronic device including a user interface and a communication circuit; at least one processor which is a part of the first electronic device or remotely communicates with the first electronic device; and at least one memory residing in the first electronic device or residing outside the first electronic device. The at least one memory may store instructions causing, when executed while being operatively connected to the processor, the at least one processor to: receive a first user request related to calling a chatbot in a character and/or voice-based chat, through the user interface; cause the chatbot to join the chat; receive a second user request for a task for the chatbot through the user interface, wherein the second user request does not include at least a part of information required to perform the task, and the at least a part of the information is stored in the at least one (Continued)

memory; receive a user authentication for sharing the at least a part of the information, through the user interface; and provide the at least a part of the information to the chatbot.

13 Claims, 17 Drawing Sheets

(56) References Cited

U.S. PATENT DOCUMENTS

| | | | | |
|---|---|---|---|---|
| 10,802,843 | B1* | 10/2020 | Carrigan | G10L 15/22 |
| 10,997,963 | B1* | 5/2021 | Baligar | G10L 15/22 |
| 11,393,463 | B2* | 7/2022 | Stonehocker | G10L 15/22 |
| 2014/0365922 | A1* | 12/2014 | Yang | G06Q 50/01 |
| | | | | 715/758 |
| 2015/0169284 | A1* | 6/2015 | Quast | G06F 16/9535 |
| | | | | 704/275 |
| 2015/0224640 | A1* | 8/2015 | Vu | G06N 3/008 |
| | | | | 901/1 |
| 2016/0078504 | A1* | 3/2016 | Kennewick, Sr. | G10L 15/1815 |
| | | | | 705/26.1 |
| 2016/0094490 | A1* | 3/2016 | Li | H04L 12/1813 |
| | | | | 709/206 |
| 2016/0335532 | A1* | 11/2016 | Sanghavi | H04L 51/212 |
| 2016/0350409 | A1* | 12/2016 | Youn | H04L 51/10 |
| 2017/0239812 | A1* | 8/2017 | Thapliya | B25J 9/0003 |
| 2018/0018861 | A1* | 1/2018 | Locke | H04N 13/204 |
| 2018/0061400 | A1* | 3/2018 | Carbune | G06F 16/3331 |
| 2018/0144615 | A1* | 5/2018 | Kinney | G07C 9/00 |
| 2020/0097965 | A1* | 3/2020 | Castoro | G10L 15/22 |
| 2020/0105257 | A1* | 4/2020 | Kwatra | G10L 25/24 |
| 2021/0035576 | A1* | 2/2021 | Kang | G10L 15/183 |
| 2021/0119802 | A1* | 4/2021 | Shetty | G10L 15/22 |
| 2022/0230021 | A1* | 7/2022 | Muehlenstaedt | G06N 3/084 |

FOREIGN PATENT DOCUMENTS

| | | |
|---|---|---|
| KR | 1020140144104 | 12/2014 |
| KR | 1020150095624 | 8/2015 |
| KR | 1020160139771 | 12/2016 |
| KR | 1020170098675 | 8/2017 |
| KR | 1020180003324 | 1/2018 |
| KR | 1020180010779 | 1/2018 |
| WO | WO2014/093339 | 6/2014 |

OTHER PUBLICATIONS

PCT/ISA/237 Written Opinion issued on PCT/KR2018/013543, dated Feb. 14, 2019, pp. 4.
Korean Office Action dated Oct. 23, 2022 issued in counterpart application No. 10-2018-0015069, 16 pages.

* cited by examiner

ELECTRONIC DEVICE FOR CHATTING WITH CHATBOT AND OPERATION METHOD THEREOF

PRIORITY

This application is a National Phase Entry of International Application No. PCT/KR2018/013543, which was filed on Nov. 8, 2018, and claims priority to Korean Patent Application No. 10-2018-0015069, filed in the Korean Intellectual Property Office on Feb. 7, 2018, the content of each of which is incorporated herein by reference.

TECHNICAL FIELD

Various embodiments of the disclosure relate to an electronic device for chatting with a chatbot and an operation method thereof.

BACKGROUND ART

With the advance of digital technology, a device for understanding human language and an application (e.g. voice recognition application) linked to the device and executed in various kinds of electronic devices have been developed. A device for understanding human language may obtain a user's intent from a sentence input in text data form and obtain a parameter required for expressing the intent. By using a device for understanding human language, various electronic devices may provide a user with a service by which the user can chat with the various electronic devices using natural language.

DISCLOSURE OF INVENTION

Technical Problem

An electronic device may provide a user interface for chatting with one device (e.g. an artificial intelligence device or artificial intelligence program) for understanding human language. However, according to the advancement of digital technology, various artificial intelligence devices for various purposes may be developed. Therefore, it may be required to provide a user interface for allowing a user of an electronic device to chat with one or more artificial intelligence devices. In addition, while a user of an electronic device is chatting with one or more artificial intelligence devices through a single user interface, information that the user does not want to transfer may be transferred to an external device.

Various embodiments may provide an electronic device and a method for providing a user interface enabling chatting with one or more artificial intelligence devices or artificial intelligence programs.

The technical subjects pursued in the disclosure may not be limited to the above-mentioned technical subjects, and other technical subjects which are not mentioned may be clearly understood, through the following descriptions, by those skilled in the art to which the disclosure pertains.

Solution to Problem

A system according to various embodiments may include: a first electronic device including a user interface and a communication circuit; at least one processor which is a part of the first electronic device or is configured to remotely communicate with the first electronic device; and at least one memory residing in the first electronic device or residing outside the first electronic device. The at least one memory may store instructions causing, when executed while being operatively connected to the processor, the at least one processor to: receive a first user request related to calling of a chatbot in a character- and/or voice-based chat, through the user interface; cause the chatbot to join the chat; receive a second user request for a task related to the chatbot through the user interface, wherein the second user request does not include at least a part of information required for performing the task, and the at least a part of the information is stored in the at least one memory; receive a user authorization for sharing the at least a part of the information, through the user interface; and provide the at least a part of the information to the chatbot.

An electronic device according to various embodiments may include: a communication module; an input device; an output device; and at least one processor configured to: perform a chat with a chatbot through a user interface relating to a chatting application, wherein the chat includes an operation of transmitting a message received through the input device to the chatbot through the communication module, or outputting a message received through the communication module from the chatbot, through the output device; during the chat, detect an event for executing at least one instruction for involving a personal information bot in the chat; using the user interface, output a chat with the personal information bot, relating to a content to be provided to the chatbot; prevent information relating to the chat with the personal information bot from being transmitted to the chatbot during the chat with the personal information bot; and transmit information relating to the content to the chatbot, based on reception of a user input for providing the information relating to the content to the chatbot.

An electronic device according to various embodiments may include: a memory; and at least one processor configured to: transmit a first message received from a first electronic device to a chatbot; transmit a response message relating to the received first message to the first electronic device, wherein the response message is obtained using a first natural-language understanding module configured to perform a function of the chatbot; identify an event for performing a chat relating to personal information of a user of the first electronic device, based on at least one of the first message or the response message; based on the identification, perform a natural-language-based chat with the user by using a second natural-language understanding module configured to perform a chat relating to personal information of the user; prevent a second message received from the first electronic device from being transmitted to the chatbot during the chat using the second natural-language understanding module; and transmit information relating to at least a part of the second message to the chatbot, based on reception, from the first electronic device, of a signal for providing the at least a part of the second message to the chatbot.

Advantageous Effects of Invention

A device and a method according to various embodiments can transmit information, desired to be transmitted by a user of an electronic device, to one or more artificial intelligence devices while the user is chatting with the one or more artificial intelligence devices through a user interface.

Effects obtainable from the disclosure may not be limited to the above-mentioned effects, and other effects which are

BEST MODE FOR CARRYING OUT THE INVENTION

Figure 1:
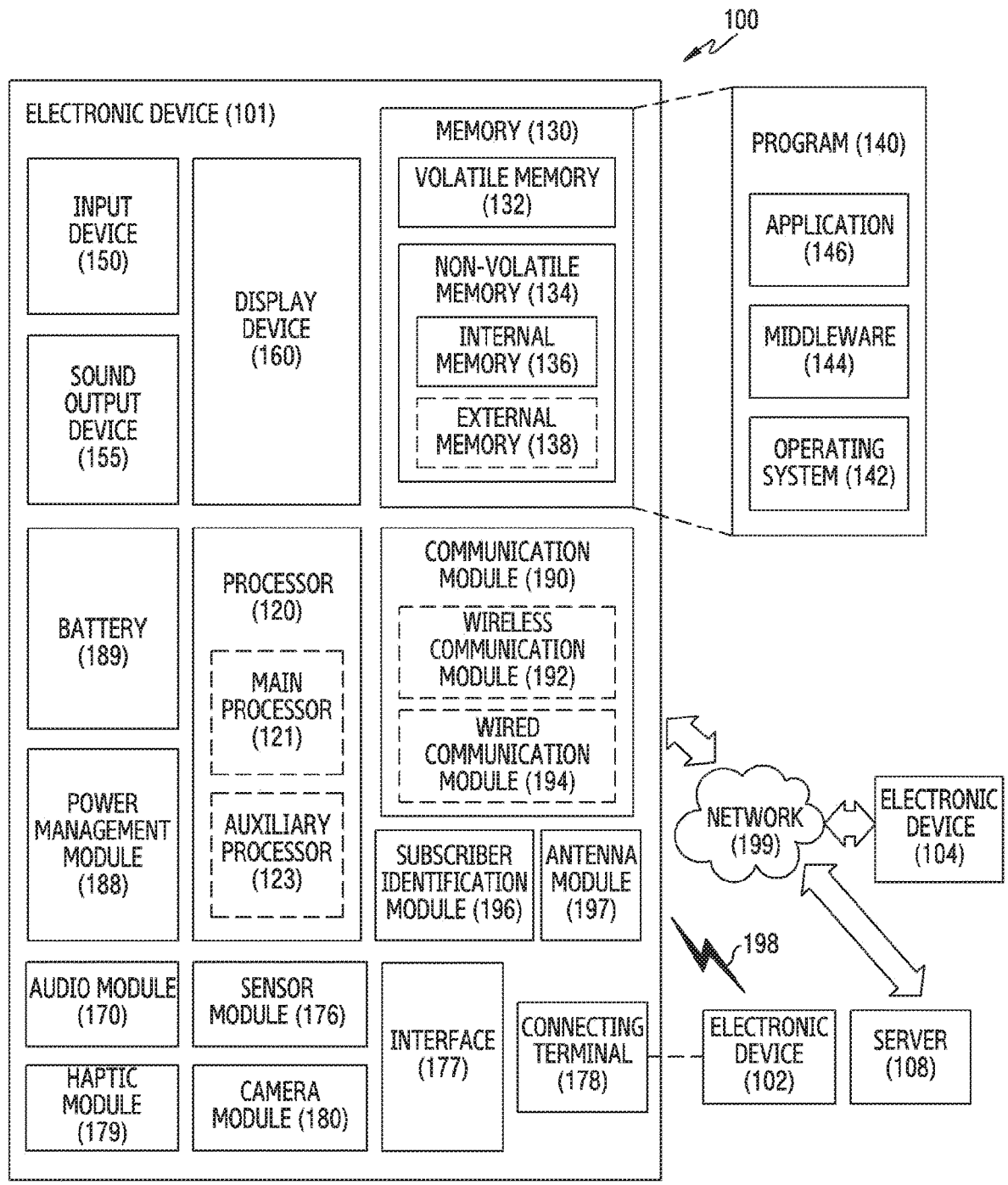
FIG. 1 is a block diagram of an electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, using subscriber information stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
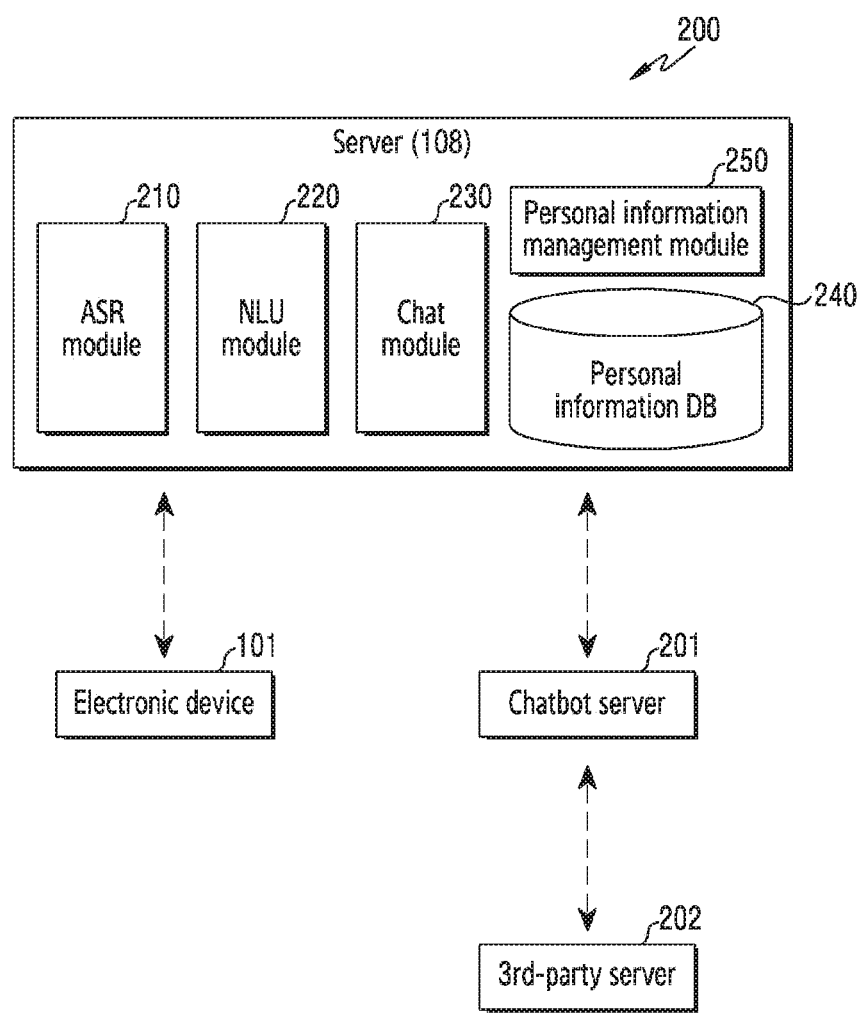
FIG. 2 illustrates an example of a network environment including an electronic device, a server, and a chatbot server according to various embodiments.

FIG. 2 illustrates an example of a network environment including an electronic device, a server, and a chatbot server according to various embodiments.

Referring to FIG. 2, a network environment 200 may include an electronic device 101, a server 108, and a chatbot server 201. The server 108 is an intelligent server and may be related to at least one of an artificial intelligence application (e.g. a voice recognition application, an intelligent application, or an artificial intelligence assistant application) or a chatting application to be operated in the electronic device 101. The server 108 may provide or support an artificial intelligence application or a chatting application to be operated in the electronic device 101. The electronic device 101 may store an artificial intelligence application or a chatting application provided by the server 108. The electronic device 101 may communicate with the chatbot server 201 through the server 108 by using an artificial intelligence application or a chatting application provided by the server 108. Hereinafter, examples of a method and a device for chatting with a chatbot (or personal information bot) through a chatting application stored in the electronic device 101 will be described. However, various embodiments are not limited thereto. The electronic device 101 may also provide a user interface for a chat between a user of the electronic device 101 and a chatbot (or personal information bot) through an artificial intelligence application (e.g. a voice recognition application, an intelligent application, or an artificial intelligence assistant application) as well as a chatting application.

In various embodiments, a chatbot or a personal information bot may be executed by at least one of the chatbot server 201, the server 108, or the electronic device 101. For example, the chatbot may be executed by using at least one of the chatbot server 201, a natural-language understanding (NLU) module for the chatbot, which is included in the server 108, a chat module (230) included in the server 108, or a chat client (or chatting application, artificial intelligence application) included in the electronic device 101. For example, the personal information bot may be executed using at least one of an NLU module for personal information, which is included in the server 108, the chat module 230 included in the server 108, a personal information management module 250 included in the server 108, or a chat client (or chatting application, artificial intelligence application) included in the electronic device 101.

The chatbot server 201 may support at least some of the functions of a chatbot for chatting with a user of the electronic device 101 through the server 108. The chatbot server 201 may support at least some of the functions of a chatbot which may chat with a user of the electronic device 101, through a chatting application (or artificial intelligence application) stored in the electronic device 101, based on the chat module 230 of the server 108. For example, the chatbot server 201 may implement a chatbot for chatting with a user of the electronic device 101 by using an automatic speech recognition (ASR) module 210 or a natural-language understanding (NLU) module 220 included in the server 108. The chatting may be based on at least one of text or voice. For the chatting, the chatbot server 201 may receive an input of the user of the electronic device 101 through the server 108 (e.g. the chat module 230) from the electronic device 101. For example, the chatbot server 201 may receive text data input by the user or text data obtained through conversion of an utterance of the user. For the chatting, the chatbot server 201 may transmit a message responding to a received user input to the electronic device 101 through the server 108 (e.g. the chat module 230).

For example, the chatbot server 201 may be an external device (e.g. external server) based on a processor, as illustrated in FIG. 2. As another example, at least some of the functions of the chatbot server 201 may be performed by the server 108. As yet another example, instead of the chatbot server 201, an array of computer programs or instructions for operating a chatbot may be implemented in the server 108 (e.g. a memory of the server 108).

In some embodiments, the chatbot server 201 may include a natural-language understanding (NLU) module (not illustrated) implemented to execute at least a part of the functions of a chatbot. For example, if a chatbot implemented in the chatbot server 201 is related to a pizza company, the chatbot server 201 may include a natural-language understanding module (hereinafter, an NLU module for the chatbot) related to a pizza menu, pizza order, or pizza delivery. The chatbot server 201 may determine or generate a message responding to a received user input by using the NLU module for the chatbot. According to an embodiment, the NLU module for the chatbot may be included in the server 108. For example, the NLU module for the chatbot may be implemented by using the natural-language understanding module 220 of the server 108. The NLU module for the chatbot included in the server 108 may be logically independent from the natural-language understanding module 220 of the server 108. The NLU module for the chatbot may be used for a function (e.g. chatting relating to a pizza order) of a chatbot, and the natural-language understanding module 220 of the server 108 may be used for an artificial intelligence application of the electronic device 101.

In some other embodiments, the chatbot server 201 may operate based on a keyword rather than understanding of natural language. For example, the chatbot server 201 may identify a designated word or phrase from a received user input. The chatbot server 201 may output (or obtain) a response message corresponding to an identified word or phrase.

According to an embodiment, the chatbot server 201 may provide a service (e.g. webpage) for implementing (or producing) multiple chatbots. The chatbot server 201 may operate multiple chatbots implemented using the service. For example, the chatbot server 201 may include multiple NLU modules corresponding to the multiple chatbots, respectively. As another example, the server 108 may include multiple NLU modules which are implemented by using the natural-language understanding module 220 and correspond to the multiple chatbots, respectively. The chatbot server 201 may obtain intent of a user or a parameter (or slot) required for expressing the intent from a user input by using the multiple NLU modules included in the chatbot server 201 or the server 108. The chatbot server 201 may determine a service (or action, task) to be provided to a user, based on an obtained intent or parameter. The chatbot server 201 may transmit a response message to be output to the electronic device 101, based on the determination through the server 108 (e.g. the chat module 230) to the electronic device 101.

The chatbot server 201 may include a server supporting connection between multiple chatbots and an external service (e.g. the server 108, and a 3rd-party server 202). For example, the chatbot server 201 may use information received from the 3rd-party server 202 (e.g. weather server) to perform a function of a chatbot implemented in the chatbot server 201.

The server 108 may include the automatic speech recognition (ASR) module 210, the natural-language understanding (NLU) module 220, the chat module 230, or the personal information management module 250. The server 108 may include a communication circuit, a memory, and a processor. The processor may execute an instruction stored in the memory to operate the automatic speech recognition module 210, the natural-language understanding module 220, the chat module 230, or the personal information management module 250. The memory of the server 108 may include a personal information database (DB) 240 (or context DB). The personal information DB 240 may be connected to the personal information management module 250. For example, the personal information management module 250 may identify and extract information stored in the personal information DB 240. The server 108 may transmit or receive data (or information) to or from the electronic device 101 or the chatbot server 201 through the communication circuit.

The automatic speech recognition (ASR) module 210 may convert a user input received from the electronic device 101 into text data. For example, the automatic speech recognition module 210 may include an utterance recognition module. The utterance recognition module may include an acoustic model and a language model. For example, the acoustic model may include information relating to vocalization, and the language model may include information relating to unit phoneme information and a combination of unit phoneme information. The utterance recognition module may convert user utterance into text data by using information relating to vocalization and information relating to unit phoneme information. Information relating to the acoustic model and language model may be stored, for example, in an automatic speech recognition database (ASR DB).

The natural-language understanding (NLU) module 220 may identify intent from a sentence or an utterance by performing syntactic analysis or semantic analysis. The natural-language understanding module 220 may identify the intent of a user input received from the electronic device 101 or the intent of an input received from the chatbot server 201. Through the syntactic analysis, a user input may be divided into grammatical units (e.g. words, phrases, and morphemes), and grammatical elements of the divided units may be identified. The semantic analysis may be performed by using semantic matching, rule matching, and formula matching. Accordingly, the natural-language understanding module 220 may obtain a domain or an intent corresponding to a user input or an input from the chatbot server 201, or a parameter (or slot) required for expressing the intent.

In some embodiments, the natural-language understanding module 220 may include an NLU module for the chatbot (NLU for chatbot). The NLU module for the chatbot may understand a conversation relating to a function of a chatbot. For example, if a chatbot implemented in the chatbot server 201 is related to a pizza company, the NLU module for the chatbot may understand a sentence or utterance related to a pizza menu, pizza order, or pizza delivery. The NLU module for the chatbot may identify an intent and a parameter related to a chat between the chatbot and a user of the electronic device 101. Intent that the NLU module for the chatbot can identify may include, for example, intent to order a pizza, or intent to order a side dish. The NLU module for the chatbot may identify a parameter required for performing a function related to the intent. For example, a parameter relating to intent to place an order may include a product name, a size, a quantity, and the date. For example, the NLU module for the chatbot may identify intent to order a pizza from a user input (utterance or text) of "Order a large potato pizza". The NLU module for the chatbot may identify, as a parameter, the product name as a potato pizza, the size as large, and the quantity as one. For example, the current date may be automatically input as the date. In an embodiment, order information identified as described above may be stored in the personal information DB 240 when a user input indicating confirmation of an order is received from the electronic device 101.

Various NLU modules for various chatbots (e.g. chatbots implemented in the chatbot server 201) as well as the chatbot as described above may be stored in the server 108. For example, the server 108 may provide a chat platform (e.g. the chat module 230) which can implement a chatbot for chatting with a user of the electronic device 101, to various business operators.

The NLU module for the chatbot as described above may be not included in the natural-language understanding module 220, and may be implemented in a separate external device (e.g. an external server or the chatbot server 201). Understanding of a chat of a chatbot as described above may be not based on an NLU module. For example, a chatbot (or the chatbot server 201) may identify an intent and a parameter described above, based on identification of a keyword (e.g. a designated word or phrase).

In various embodiments, the natural-language understanding module 220 may include an NLU module for personal information (NLU for PI). For example, while a user of the electronic device 101 is chatting with a chatbot implemented by the chatbot server 201 through the chat module 230 of the server 108, by using a chatting application (or artificial intelligence application), the need to provide personal information of the user to the chatbot may occur. For example, while the user of the electronic device 101 is chatting with a chatbot of a pizza company, using the chatbot server 201, to order a pizza, the user may be required to input an address, card information, or an email address. The NLU module for PI may understand a conversation for providing personal information of a user of the electronic device 101 to a chatbot (or the chatbot server 201). While the NLU module for PI is operated, a user input received from the electronic device 101 may be provided to the NLU module for PI instead of the NLU module for the chatbot. While the NLU module for PI is operated, a user input received from the electronic device 101 may not be provided to the chatbot server 201. While the NLU module for PI is operated, an entity that chats with the user of the electronic device 101 may be output from the electronic device 101 in the manner of a personal information bot different from the chatbot. A personal information bot (PI bot) may be output subsequent to a chat with a chatbot through a chatting application (or artificial intelligence application) of the electronic device 101.

For example, the NLU module for personal information may be implemented by using the natural-language understanding module 220 of the server 108. The NLU module for personal information included in the server 108 may be logically independent from the natural-language understanding module 220 of the server 108. As another example, the NLU module for personal information may also be implemented outside the natural-language understanding module 220.

The chat module 230 may be a platform that can operate a chatting application stored in the electronic device 101. The chat module 230 may include, for example, a hardware architecture or a software framework which can operate a chatting application. The chat module 230 may be software stored in the memory of the server 108. At least a part of the chat module 230 may be included in the processor of the server 108, and the chat module 230 may be implemented as a combination of software and hardware. The chat module 230 may be implemented outside the server 108.

The chat module 230 may generate a chat session between the electronic device 101 and a chatbot operated in the chatbot server 201. Through the chat session, the chat module 230 may transmit data received from the electronic device 101 to the chatbot server 201 (or chatbot), and may transmit data received from the chatbot server 201 (or chatbot) to the electronic device 101.

The chat module 230 may transmit data (e.g. text data of "I want to place an order" or text data obtained through conversion of an utterance) received from the electronic device 101 to the chatbot server 201 (or the NLU module for the chatbot). The chat module 230 may transmit data relating to a response message received from the chatbot server 201 to the electronic device 101 by using a chat session. A response message of a chatbot, received from the chatbot server 201, may be output through a graphical user interface or a sound output device of the electronic device 101.

In various embodiments, during a chat with a chatbot, performed by the chatbot server 201, the need to provide personal information (e.g. an address, card information, or an email address) of the user to the chatbot (or the chatbot server 201) may arise. If personal information of a user is required to be provided to a chatbot (or the chatbot server 201), a personal information bot (PI bot) may be implemented in the server 108 (e.g. NLU module for personal information) in order to perform a chat relating to personal information. A personal information bot may be output through the electronic device 101 in a manner of participating in a chat with a chatbot.

The chat module 230 (or processor) may detect an event for involving a personal information bot in the chat session while a chat with the chatbot is proceeding in the chat session.

In some embodiments, the chat module 230 (or processor) may identify a keyword related to personal information from data received through a chat session, in order to detect an event for involving a personal information bot in the chat session. For example, the chat module 230 may identify the keyword "address" from data relating to "Please input the address" received from the chatbot server 201 or data relating to "Let me know address information" received from the electronic device 101. The chat module 230 (or processor) may detect an event for involving a personal information bot in a chat session, based on identification of a designated keyword from data received through the chat session.

In some other embodiments, the chat module 230 (or processor) may identify the intent of a chat (e.g. "Let me know address information" or "Please input the address") by using the NLU module for personal information, to detect an event for involving a personal information bot in a chat session. The chat module 230 (or processor) may detect an event for involving a personal information bot in a chat session, based on identification that the intent of a chat is intent to input personal information (e.g. address input), by using the NLU module for personal information.

In yet some other embodiments, the chat module 230 (or processor) may detect an event for involving a personal information bot in a chat session, based on identification of a designated word (or a word for calling an artificial intelligence assistant) from data received from the electronic device 101. For example, the chat module 230 (or processor) may detect an event for involving a personal information bot in a chat session, based on identification of the designated word "Bixby" from data relating to "Bixby, let me know address information" received from the electronic device 101. As another example, if a designated word is identified in a user input, the chat module 230 may use the natural-language understanding module 220 (or the NLU module for personal information) to identify the intent of the user input so as to detect an event for involving a personal information bot. The chat module 230 may detect an event for involving a personal information bot, based on identification of an intent of requiring a voice assistant to perform a task, from a user input.

In yet some other embodiments, the chat module 230 (or processor) may receive a control signal for involving a personal information bot in a chat session from the electronic device 101. For example, the electronic device 101 (e.g. chat client) may receive a user input (e.g. an input on a physical button, an input on an icon, or an utterance including a designated word (e.g. Bixby)) for involving a personal information bot in a chat session with a chatbot. The electronic device 101 may transmit a control signal to the server 108 (e.g. the chat module 230 or the processor), based on a user input. The server 108 (e.g. the chat module 230 or the processor) may detect an event for involving a personal information bot in a chat session with a chatbot, based on reception of the control signal.

If the chat module 230 (or processor) has detected an event for involving a personal information bot, the chat module may prevent transmission, to the chatbot server 201, of data relating to a user input received through a chatting application from the electronic device 101. The chat module 230 (or processor) may provide data relating to data received through a chatting application from the electronic device 101 to the NLU module for personal information, based on detection of an event for involving a personal information bot, without transmitting the data to the chatbot server 201 (or the NLU module for the chatbot). The chat module 230 (or processor) may transmit a response message, generated (or determined) using the NLU module for personal information, to the electronic device 101. The response message may be output in a chatting application of the electronic device 101 as a response message of a personal information bot (PI bot) different from a chatbot.

The personal information management module 250 (or the processor) may identify (or retrieve) required personal information (e.g. an address) from the personal information DB 240 while a chat is performed with a user of the electronic device 101 in the manner of a personal information bot (PI bot) by using the NLU module for personal information. The chat module 230 (or processor) may transmit a message relating to personal information identified from the personal information DB 240 to the electronic device 101. The chat module 230 (or processor) may not transmit the identified personal information to the chatbot server 201 (or the NLU module for the chatbot) while a chat is performed with the user of the electronic device 101 in the manner of a personal information bot (PI bot) by using the NLU module for personal information. The chat module 230 (or processor) may transmit the personal information to the chatbot server 201, based on reception of an authorization or authentication for providing the personal information to the chatbot server 201 from the electronic device 101.

In various embodiments, the processor (e.g. the chat module 230 and the personal information management module 250) of the server 108 may perform at least some of the functions explained through FIGS. 5 to 17 below.

The memory of the server 108 may include the personal information DB 240. The personal information DB 240 (or context DB) may store, for example, personal information (e.g. address, email, and card information) of a user of the electronic device 101. As another example, the personal information DB 240 may store information relating to a purpose or a function of a chatbot. For example, if a chatbot implemented in the chatbot server 201 is related to a pizza company, the personal information DB 240 may store a user-specific order record. The personal information DB 240 may store, for example, information relating to a purpose or a function of each of various chatbots, as well as a chatbot related to a pizza company, according to the user (e.g. user ID) of the electronic device. A detailed description relating to information stored in the personal information DB 240 will be given below in Tables 1 and 2.

At least a part of the operations of the server 108 as described above may be performed by the electronic device 101. A detailed description relating to the electronic device 101 will be given below with reference to FIG. 3.

Figure 3:
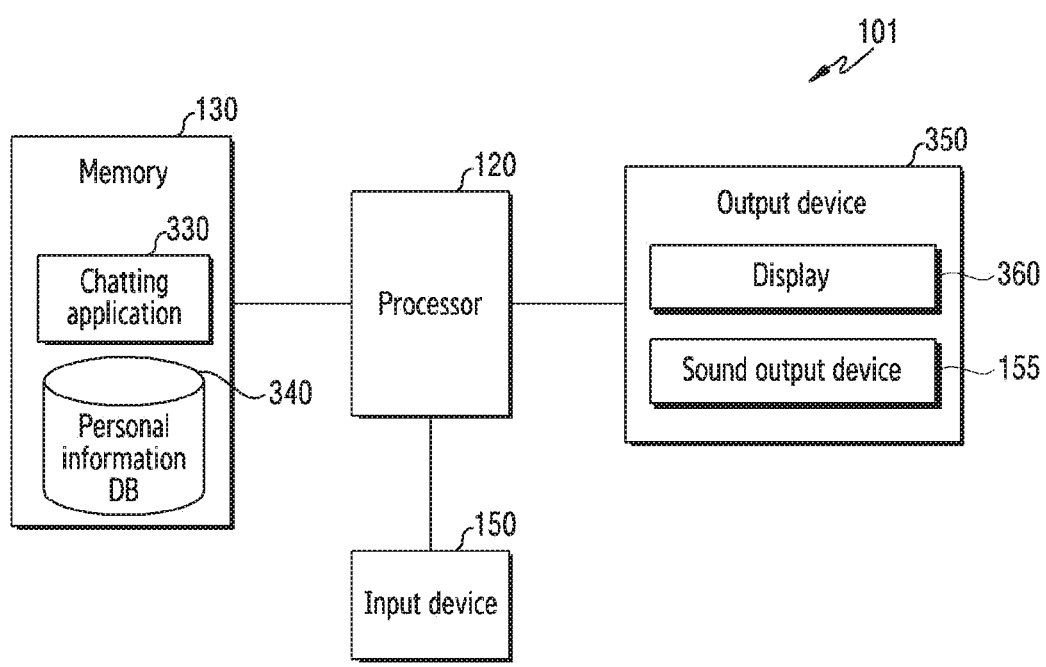
FIG. 3 illustrates an example of an electronic device according to various embodiments.

FIG. 3 illustrates an example of the electronic device 101 according to various embodiments.

Referring to FIG. 3, the electronic device 101 may include an input device 150, an output device 350, a processor 120, and a memory 130.

The electronic device 101 according to various embodiments may include a device (e.g. a smartphone, a tablet PC, and a wearable device) including a display (e.g. the display device 160 or a display 360) or a device (e.g. an artificial intelligence (AI) speaker) not including a display. The electronic device 101 (e.g. the memory 130) may store a chat client (e.g. a chatting application 330) connected to the chat module 230 of the server 108. The electronic device 101 may perform an artificial intelligence assistant (AI assistant) function through a chat client (e.g. the chatting application 330) connected to the server 108. For example, the chat client may function to output (or display) a chat between a chatbot (or personal information bot) and a user to the electronic device 101.

The input device 150 is a device for receiving a command or data to be used in an element (e.g. the processor 120) of the electronic device 101 from the outside (e.g. user) of the electronic device 101, and may include, for example, a microphone, a keyboard, or a touch panel. The input device 150 (e.g. a touch panel) may be combined with at least a part of the output device 350 (e.g. the display 360) to be implemented.

The output device 350 may include at least one of the display 360 or the sound output device 155. The display 260 may correspond to, for example, the display device 160 in FIG. 1. The sound output device 155 may include a speaker. For example, the electronic device 101 (e.g. an AI speaker) may include only the sound output device 155 as the output device 350, without including the display 360.

The display 360 may display a screen. The display 360 may display a graphical user interface (GUI) of the chatting application 330. The display 360 may display an object (or an image) indicating a chatbot or a personal information bot in a GUI of the chatting application 330. The display 360 may display a message received from a chatbot (or the chatbot server 201) in a GUI of the chatting application 330. The display 360 may display a message, obtained using the NLU module for personal information of the server 108, in a GUI of the chatting application 330 as a message of a personal information bot.

The sound output device 155 may output a sound. The sound output device 155 may output a message (e.g. words or chat) of a chatbot or a message (e.g. words or chat) of a personal information bot through the chatting application 330. According to an embodiment, the sound output device 155 may output a message of a chatbot and a message of a personal information bot with different voices. According to an embodiment, if the electronic device 101 is an AI speaker, a user interface of the chatting application 330 may include a microphone and the sound output device 155 (e.g. a speaker).

The processor 120 may control the overall operation of the electronic device 101. The processor 120 may receive commands from other elements (e.g. the input device 150, the output device 350, the display 360, the sound output device 155, and the memory 130), interpret the received commands, and perform calculations or process data according to the interpreted commands. The processor 120 may be implemented as software, may be implemented as hardware such as a chip and circuitry, and may be implemented as a combination of software and hardware. The processor 120 may be one in number, or may be an array of a plurality of processors.

The processor 120 may execute the chatting application 330 (e.g. an application 143) which may be stored in the memory 130 and supported by the server 108 (or the chat module 230). The processor 120 may transmit or receive data relating to a message (or chat) to or from a chatbot (or the chatbot server 201) through the server 108 by using the chatting application 330. The processor 120 may transmit or receive data relating to a message (or chat) to or from a personal information bot (or the server 108) by using the chatting application 330.

The processor 120 may output a user input received through the input device 150 through the display 360 in a GUI of the chatting application 330. If the electronic device 101 is an AI speaker, the processor 120 may output a user input received through the input device 150 (e.g. microphone) through the sound output device 155 (e.g. speaker).

The processor 120 may transmit a user input (e.g. text data or voice data) received through the input device 150 to the server 108. The processor 120 may receive a response message from a chatbot, relating to the user input, through the server 108 from the chatbot server 201. The processor 120 may receive a response message from a chatbot through the chatting application 330 of the electronic device 101 from the chat module 230 of the server 108. The processor 120 may output the received response message through the output device 350. For example, the processor 120 may display the received response message as a message of a chatbot in a GUI of the chatting application 330 through the display 360. As another example, the processor 120 may output the received response message through the sound output device 155 as though the chatbot were uttering the message.

While the processor 120 transmits or receives data to or from the chatbot server 201 through the chatting application 330, the processor may detect an event for involving a personal information bot in a chat with a chatbot operated in the chatbot server 201. For example, the processor 120 may identify a designated keyword relating to personal information from data received from the chatbot server 201, or may identify a user input (e.g. an input on a physical button, an input on an icon, and an utterance including a designated word (e.g. Bixby)) for calling a personal information bot. The processor 120 may transmit a control signal for involving a personal information bot in a chat with chatbot to the server 108. As another example, the processor 120 may receive a control signal for involving a personal information bot in a chat with chatbot from the server 108.

The processor 120 may chat with a personal information bot through the chatting application 330, based on detection of an event for involving the personal information bot in a chat with a chatbot operated in the chatbot server 201. For example, the processor 120 may receive a message, obtained using the NLU module for personal information (NLU for PI), from the server 108. The processor 120 may output the received message as a message of the personal information bot through the output device 350. The processor 120 may output a message of a personal information bot as though the personal information bot were participating in a chat session with a chatbot operated in the chatbot server 201. For example, the processor 120 may display an object (e.g. image) indicating a personal information bot and a message of the personal information bot in a GUI (e.g. a chat room with a chatbot) of the chatting application 330 through the display 360. As another example, the processor 120 may output a message of a personal information bot through the sound output device 155 as though the personal information bot were uttering the message. The processor 120 may output a message of a personal information bot in a voice different from that of a chatbot through the sound output device 155.

For example, the processor 120 may prevent transmission of a user input or a message of a personal information bot to the chatbot server 201 (or the NLU module for the chatbot) during a chat with the personal information bot through the chatting application 330. For example, the processor 120 may identify personal information stored in a personal information DB 340 of the memory 130 during a chat with a personal information bot. For example, the processor 120 may identify personal information corresponding to a chat with the personal information bot in the personal information DB 340 of the memory 130 and output a chat relating to the identified personal information. At least a part of the operations as described above may be performed by the server 108. For example, the processor (e.g. the chat module 230) of the server 108 may prevent transmission of a chat with a personal information bot to the chatbot server 201 while the electronic device 101 is chatting with the personal information bot by using the NLU module for personal information. For example, the processor (e.g. the personal information management module 250) of the server 108 may access the personal information DB 240 of the server 108 to identify personal information corresponding to a chat with a personal information bot. The processor (e.g. the chat module 230) of the server 108 may transmit a message of a personal information bot, relating to the identified personal information, to the electronic device 101.

The processor 120 may receive a user input (e.g. the utterance or text of "Share it") for providing personal information, output in the form of a chat with a personal information bot, to the chatbot server 201 (or the NLU module for the chatbot). The processor 120 (or the processor (e.g. the chat module 230) of the server 108) may provide (or transmit) the personal information to the chatbot server 201 (or chatbot), based on reception of the user input.

The processor 120 may perform additional authentication for providing the personal information to the chatbot server 201. The processor 120 may perform additional authentication for providing personal information to the chatbot server 201, based on at least one of voice information, iris information, face recognition information, fingerprint information, or the password of a user of the electronic device 101. For example, the processor 120 may obtain voice information for seamless authentication from a user input (e.g. the utterance "Share it") for providing the personal information to the chatbot server 201. The processor 120 may authenticate the user input, based on identification that the voice information obtained from the user input corresponds to the voice of the user of the electronic device 101. As another example, the processor 120 may obtain face recognition information of the user of the electronic device 101 by using the camera module 180 (e.g. an image sensor) during a chat with the personal information bot. The processor 120 may obtain iris information or fingerprint information of the user of the electronic device 101 by using the sensor module 176 (e.g. an iris sensor or a fingerprint sensor) during a chat with the personal information bot. The processor 120 may authenticate the user input, based on the obtained face recognition information, iris information, or fingerprint information. As another example, the processor 120 may authenticate the user input, based on reception of a password input by the user of the electronic device 101. According to an embodiment, the processor 120 may perform the authentication operation in response to detection of an event for involving a personal information bot in a chat with a chatbot.

The processor 120 may receive a user input for providing personal information to the chatbot server 201 and provide (or transmit) the personal information to the chatbot server 201, based on performing authentication as described above.

The processor 120 may terminate a chat with the personal information bot to provide (or transmit) personal information to the chatbot server 201. Alternatively, the processor 120 may terminate a chat with the personal information bot, based on providing (or transmitting) personal information to the chatbot server 201. The processor 120 may chat with a chatbot operated through the chatbot server 201 subsequent to a chat with the personal information bot, based on terminating the chat with the personal information bot.

At least a part of the operations of the processor 120 as described above may be performed by the server 108. In various embodiments, the processor 120 may perform at least some of the functions explained through FIGS. 5 to 17 below.

The memory 130 may be an array of one or more memories. The memory 130 may execute instructions stored in the memory 130, based on signaling with the processor 120. The memory 130 may store data and/or commands received from other elements (e.g. the processor 120, the input device 150, the output device 350, and the display 360) or generated by other elements.

In various embodiments, the memory 130 may store the chatting application 330 connected to the chat module 230 of the server 108. The electronic device 101 may support a chat with a chatbot operated by the chatbot server 201 through the chat module 230 of the server 108 and the chatting application 330 of the electronic device 101. The memory 130 may store the personal information DB 340. A detailed description relating to information stored in the personal information DB 340 will be given below in Tables 1 and 2.

TABLE 1

| feature | |
|---|---|
| | age |
| value | 36 |
| source | Samsung account |
| | gender |
| value | male |
| source | Samsung account |
| | credit card |
| number | 5450 0123 0002 8431 |
| valid date | November 2018 |
| cvc | 721 |
| source | user |
| | birthday |
| number | 1982 November 22 |
| source | Samsung account |
| | physical information |
| height | 180 cm |
| weight | 77 kg |
| source | Samsung health |
| | credit card |
| number | 5450 0001 0002 0003 |
| valid date | December 2020 |

TABLE 1-continued

| feature | |
|---|---|
| cvc | 777 |
| source | Samsung pay phone number |
| number | 010 555 5554 |
| source | contact address |
| value | Yeongtong, Suwon-si, Gyeonggi-do |
| source | Samsung account address |
| value | Bucheon, Suwon-si, Gyeonggi-do |
| source | user email address |
| value | testking@samsung.com |
| source | Samsung email |

Table 1 shows an example of a personal information database (DB) according to various embodiments. The personal information database (DB) in Table 1 may be stored in at least one of the memory 130 (e.g. the personal information DB 340) of the electronic device 101 or the memory (e.g. the personal information DB 240) of the server 108.

Referring to Table 1, the personal information DB 240 or 340 may store personal information according to a user ID. The user ID may be assigned according to the account of the user. The user ID may be used to distinguish the user of the electronic device 101 from other users. If there are multiple devices registered in one user account, a user ID may be associated with the IDs of the multiple devices.

For example, the personal information DB 240 or 340 may store personal information such as age, sex, card information, phone number, and address, with respect to user ID 77778. The personal information may be received from another application or another server, and may be input by the user of the electronic device 101. For example, the personal information DB 240 or 340 may store data relating to features indicating the type of information, a value or number as the content of the information, and a source indicating the information input route. For example, the personal information DB 240 or 340 may receive information through an application programming interface (API) from an account, a payment application, a health application, contacts, or an email account. The personal information DB 240 or 340 may receive information input from a user.

Figure 4:
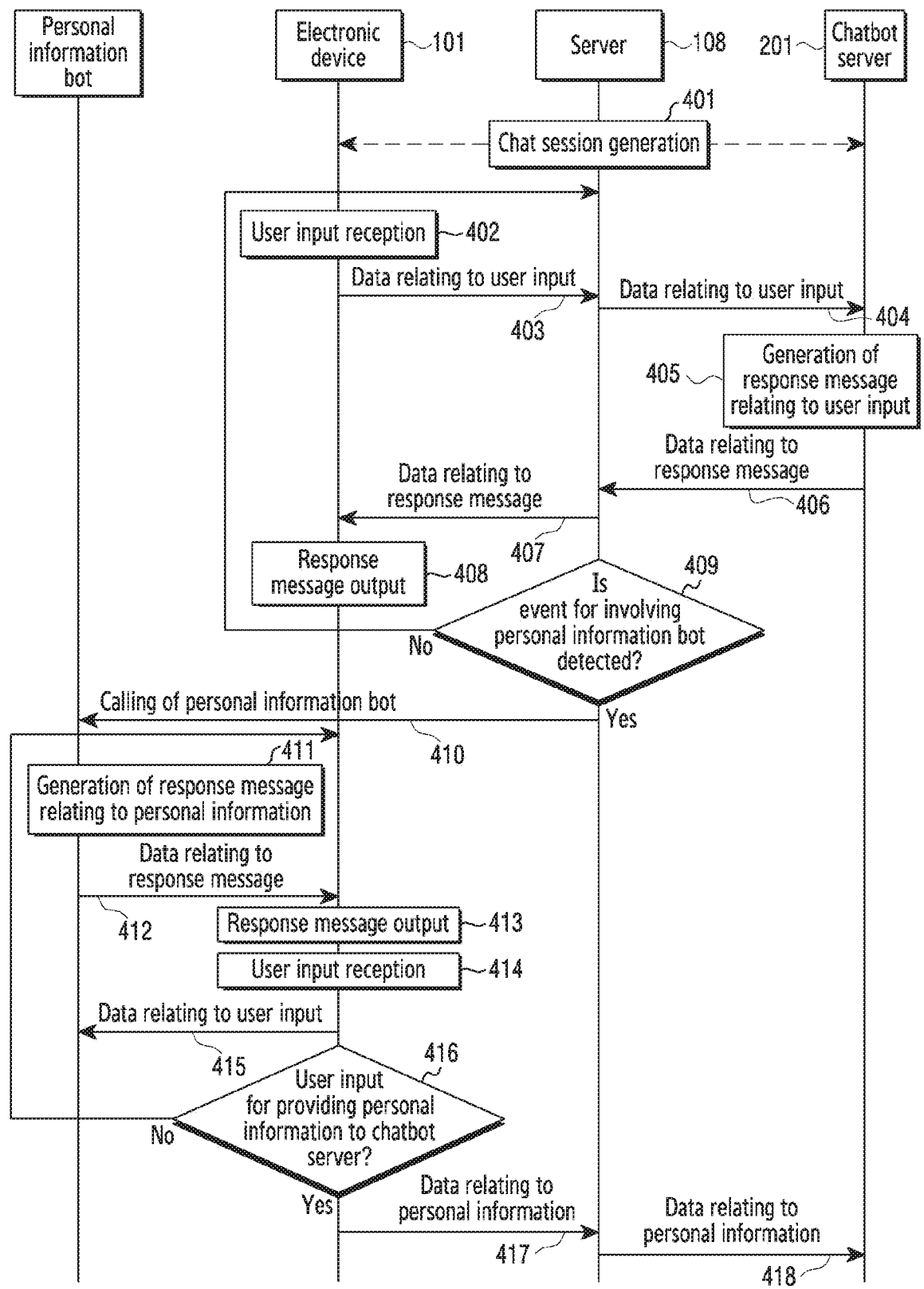
FIG. 4 illustrates an example of a signal flow between an electronic device, a server, and a chatbot server according to various embodiments.

FIG. 4 illustrates an example of a signal flow between an electronic device, a server, and a chatbot server according to various embodiments.

Referring to FIG. 4, in operation 401, the server 108 may generate a chat session between the electronic device 101 and a chatbot supported by the chatbot server 201. According to various embodiments, the server 108 may receive a control signal for starting a chat with a chatbot supported by the chatbot server 201 from the electronic device 101. For example, the electronic device 101 may execute the chatting application 330 (or an artificial intelligence application), based on a user input. The electronic device 101 may transmit a control signal for starting a chat with a chatbot included in the chatbot server 201 to the server 108 (e.g. the chat module 230), based on reception of an input to a GUI of the chatting application 330 (or an artificial intelligence application) or reception of a user's utterance requesting a chat with a chatbot through a microphone. Based on reception of a control signal for starting a chat with a chatbot from the electronic device 101, the server 108 may generate a chat session including the electronic device 101 and the chatbot.

In operation 402, the electronic device 101 may receive a user input while the chatting application 330 (or an artificial intelligence application) is being executed. The user input may include a user's text input or a user utterance for chatting with the chatbot. For example, the electronic device 101 may receive a user input for ordering to the chatbot or a user input relating to selection from a menu in a chat with the chatbot relating to food or delivery.

In operation 403, the electronic device 101 may transmit data relating to the received user input through the chatting application 330 to the server 108 (or the chat module 230). The data relating to the user input may include text data or data relating to the user utterance. The server 108 (or the chat module 230) may receive the data relating to the user input from the electronic device 101 (or the chatting application 330).

In operation 404, the server 108 may transmit data relating to the user input to the chatbot server 201. The data relating to the user input, which is transmitted to the chatbot server 201, may be of a type different from that of the data relating to the user input, which is received from the electronic device 101.

If the data relating to the user input, which is received from the electronic device 101, is data relating to a user utterance, the server 108 may change the data relating to the user utterance to text data by using the automatic speech recognition (ASR) module 210. The server 108 may transmit the text data obtained through conversion through the automatic speech recognition (ASR) module 210, or text data received from the electronic device 101 to an NLU module for the chatbot (NLU for chatbot).

In some embodiments, if the NLU module for the chatbot is included in the server 108, the server 108 may identify an intent and a parameter (or slot) of the user input by using the NLU module for the chatbot. The server 108 may transmit data relating to the intent of the user input and data relating to the parameter of the user input, which is identified by using the NLU module for the chatbot, to the chatbot server 201. The chatbot server 201 may receive the data relating to the intent of the user input and the data relating to the parameter of the user input.

In some other embodiments, the NLU module for the chatbot is included in the chatbot server 201, the server 108 may transmit data (e.g. text data obtained through conversion through the automatic speech recognition (ASR) module 210, or text data received from the electronic device 101) relating to the user input to the chatbot server 201. The chatbot server 201 may receive the data relating to the user input. The chatbot server 201 may identify an intent and a parameter (or slot) of the user input from the received data (e.g. text data) relating to the user input by using the NLU module for the chatbot.

In operation 405, the chatbot server 201 may generate a response message of the chatbot, relating to the user input. The chatbot server 201 may determine a chatbot service (or action or task) to be provided to the user, based on the intent or parameter of the user input. The chatbot server 201 may determine or obtain a response message of the chatbot, to be output in the electronic device 101, based on the determination.

In operation 406, the chatbot server 201 may transmit data relating to the obtained response message of the chatbot to the server 108 (or the chat module 230). The server 108 (or the chat module 230) may receive the data relating to the response message of the chatbot from the chatbot server 201.

In operation 407, the server 108 (or the chat module 230) may transmit the data relating to the response message of the chatbot to the electronic device 101. The server 108 (or the chat module 230) may transmit the data relating to the response message of the chatbot through the chat session between the electronic device 101 and the chatbot to the electronic device 101. The electronic device 101 may receive the data relating to the response message of the chatbot from the server 108 (or the chat module 230) through the chatting application 330 (or an artificial intelligence application).

In operation 408, the electronic device 101 may output the response message of the chatbot. The electronic device 101 may output the response message of the chatbot in the GUI of the chatting application 330 on a screen. The electronic device 101 may output the response message of the chatbot through the microphone in the chatting application 330 (or an artificial intelligence application) as though the chatbot were uttering the message.

In operation 409, the server 108 may detect an event for involving a personal information bot in a chat with the chatbot. Operation 409 may be performed in parallel (or continuously) while operations 402 to 408 are performed. The server 108 may repeatedly perform operations 402 to 408, based on non-detection of an event for involving a personal information bot, so as to support a chat between the user of the electronic device 101 and the chatbot of the chatbot server 201. At least a part of operation 409 may be performed by the electronic device 101.

For example, the server 108 may identify the intent of the user input from the data relating to the user input (e.g. "Let me know address information"), received from the electronic device 101 in operation 403, by using the NLU module for personal information (NLU for PI). The server 108 may identify the intent of the response message of the chatbot from the data relating to the response message (e.g. "Please input the address") received from the chatbot server 201 in operation 406, by using the NLU module for personal information (NLU for PI). The server 108 may detect an event for involving a personal information bot in a chat with the chatbot, based on identification of the intent of the user input or the intent of the response message of the chatbot, which is related to personal information.

As another example, the server 108 may identify a keyword (e.g. "address") related to personal information from the data relating to the user input (e.g. "Let me know address information") received from the electronic device 101 in operation 403 or the data relating to the response message (e.g. "Please input the address") received from the chatbot server 201 in operation 406. The server 108 may detect an event for involving a personal information bot in a chat with the chatbot, based on the identification. Alternatively, the electronic device 101 may identify the keyword, and the server 108 may receive a control signal for involving a personal information bot from the electronic device 101 that identified the keyword.

As yet another example, at least a part of operation 409 may be performed by the electronic device 101. For example, a chat client connected to the chat module 230 of the server 108 and included in the electronic device 101 may detect an event for involving a personal information bot in a chat with the chatbot. For example, the electronic device 101 (e.g. chat client) may receive a user input (e.g. an input on a physical button, an input on an icon, or an utterance including a designated word (e.g. Bixby)) for involving a personal information bot in a chat with the chatbot. The electronic device 101 may transmit a control signal for involving the personal information bot in the chat with the chatbot to the server 108, based on the reception. The server 108 may detect the event for involving the personal information bot, based on reception of the control signal from the electronic device 101.

In operation 410, the server 108 may call or operate the personal information bot, based on detection of the event for involving the personal information bot in the chat with the chatbot. For example, the personal information bot may be included in the server 108. The personal information bot may perform a function (i.e. a chat relating to personal information) through at least one of the NLU module for personal information, which is included in the server 108, the chat module 230 included in the server 108, the personal information management module 250 included in the server 108, or the chat client (or a chatting application, or artificial intelligence application) included in the electronic device 101.

In operation 411, the personal information bot may generate a response message (e.g. "There is the stored address", "Yeongtong, Suwon-si, Gyeonggi-do") of the personal information bot, relating to personal information.

For example, the personal information bot may identify the intent of a user input (e.g. "Let me know address information") or a response message (e.g. "Please input the address") of the chatbot, which is related to the detection of the event, from the user input or the response message by using the NLU module for personal information (NLU for PI). The personal information bot may control the personal information management module 250, based on the identified intent. The personal information bot may extract (or retrieve) information (e.g. an address) related to the identified intent (e.g. intent related to input of an address) from the personal information DB 240 by using the personal information management module 250. The personal information bot may generate a response message (e.g. "There is the stored address", "Yeongtong, Suwon-si, Gyeonggi-do") of the personal information bot by using the extracted information. The function of the personal information bot may be performed by the processor of the server 108.

At least a part of operation 411 may also be performed by the electronic device 101. For example, the electronic device 101 may extract (or retrieve) information (e.g. an address) related to the identified intent (e.g. intent related to input of an address) from the personal information DB 340 stored in the electronic device 101. The electronic device 101 may transmit the extracted information (e.g. an address) to the server 108. The personal information bot may generate a response message of the personal information bot, based on the information (e.g. an address) received from the electronic device 101.

In operation 412, the personal information bot may transmit data relating to the response message of the personal information bot through the server 108 (or the chat module 230) to the electronic device 101. The personal information bot may transmit, to the electronic device 101, the data relating to the response message of the personal information bot through the chat session between the electronic device 101 and the chatbot, based on the chat module 230 of the server 108.

For example, the server 108 (or the chat module 230) may generate a chat session between the personal information bot and the electronic device 101, which is related to the chat session between the electronic device 101 and the chatbot. The chat session between the personal information bot and the electronic device 101 may be associated with the chat session between the electronic device 101 and the chatbot.

The chat session between the personal information bot and the electronic device 101 may be a lower-level session than the chat session between the electronic device 101 and the chatbot. The chat session between the personal information bot and the electronic device 101 may be a temporary and independent session in the chat session between the electronic device 101 and the chatbot. The server 108 (or the chat module 230) may transmit the data relating to the response message of the personal information bot to the electronic device 101 by using, for example, the generated chat session between the electronic device 101 and the personal information bot.

The server 108 (or the chat module 230) may prevent transmission of the data relating to the response message (or user input) of the personal information bot to the chatbot server 201 (or the chatbot) during the chat (e.g. operations 410 to 414) with the personal information bot. For example, the server 108 (or the chat module 230) may use the chat session between the electronic device 101 and the personal information bot, thereby preventing transmission of the response message of the personal information bot to the chatbot server 201 (or the chatbot). The prevention of transmission of the data relating to the response message of the personal information bot to the chatbot server 201 (or the NLU module for the chatbot) can protect personal information of the user and prevent incorrect operation of the chatbot. The operation described above may be performed by the electronic device 101. For example, the electronic device 101 may prevent transmission of the response message of the personal information bot to the chatbot server 201 (or the chatbot). The electronic device 101 (e.g. chat client) merely outputs the response message of the personal information bot through the electronic device 101, and may prevent transmission of the data relating to the response message of the personal information bot to the server 108. The electronic device 101 (e.g. chat client) merely displays the response message of the personal information bot through a GUI (e.g. a chat room with the chatbot) relating to the chatting application 330, and may prevent transmission of the data relating to the response message of the personal information bot to the chat module 230 of the server 108. Through the prevention of transmission of data relating to the response message of the personal information bot to the server 108, the electronic device 101 may prevent transmission of the response message of the personal information bot to the chatbot server 201 (or the chatbot).

The electronic device 101 may receive the data relating to the response message of the personal information bot from the server 108 (or the chat module 230) through the chatting application 330 (or an artificial intelligence application).

In operation 413, the electronic device 101 may output the response message of the personal information bot. The electronic device 101 may output the response message of the personal information bot in the GUI of the chatting application 330. For example, the electronic device 101 may output the response message of the personal information bot by using a chat room with the chatbot. The electronic device 101 may output the response message of the personal information bot as though the personal information bot were participating in the chat room with the chatbot.

The electronic device 101 may output the response message of the personal information bot through the microphone in the chatting application 330 (or an artificial intelligence application) as though the personal information bot were uttering the message. The electronic device 101 may output the response message of the personal information bot as though the personal information bot were participating in a chat with the chatbot.

In operation 414, the electronic device 101 may receive a user input through the chatting application 330 (or an artificial intelligence application). The user input may include a user's text input or a user utterance for a chat (i.e. a chat relating to personal information) with the personal information bot.

In operation 415, the electronic device 101 may transmit data relating to the user input received through the chatting application 330 (or an artificial intelligence application) through the server 108 (or the chat module 230) to the personal information bot. For example, the electronic device 101 may transmit the data relating to the user input to the server 108 (or the chat module 230) by using the generated chat session between the electronic device 101 and the personal information bot. The personal information bot may receive the data relating to the user input from the electronic device 101 through the chat module 230 of the server 108.

The server 108 may prevent transmission of the data relating to the user input to the chatbot server 201 during the chat (e.g. operations 410 to 414) with the personal information bot. For example, the server 108 (or the chat module 230) may use the chat session between the electronic device 101 and the personal information bot, thereby preventing transmission of a response message of the personal information bot to the chatbot server 201 (or the NLU module for the chatbot).

In operation 416, the electronic device 101 may receive a user input (e.g. "Share it" or "Transfer") for providing personal information to the chatbot server 201. Operation 416 may be performed in parallel (or continuously) while operations 411 to 415 are performed. The server 108 may repeatedly perform operations 411 to 415, based on non-reception of a user input for providing personal information to the chatbot server 201, so as to support a chat between the user of the electronic device 101 and the personal information bot.

In operation 417, the electronic device 101 may transmit data relating to personal information (e.g. an address) to the server 108, based on reception of a user input for providing the personal information to the chatbot server 201. The data relating to the personal information may include a control signal for providing the personal information to the chatbot server 201. The data relating to the personal information may include personal information (e.g. "Yeongtong, Suwon-si, Gyeonggi-do") selected based on an user input. For example, the data relating to the personal information may be extracted in a type of a required parameter (e.g. "Yeongtong, Suwon-si, Gyeonggi-do") from a chat with the personal information bot. As another example, the data relating to the personal information may be a type of a response message of the personal information bot.

The server 108 may receive the data relating to the personal information (e.g. an address) from the electronic device 101 together with a control signal for providing the personal information to the chatbot server 201.

In operation 418, the server 108 (or the chat module 230) may transmit the data relating to the personal information (e.g. an address) to the chatbot server 201. The server 108 (or the chat module 230) may transmit the data relating to the personal information to the chatbot server 201 only if the server receives the control signal for providing the personal information to the chatbot server 201 from the electronic device 101. Therefore, personal information of the user can be protected, and incorrect operation of the chatbot can be prevented.

Figure 5:
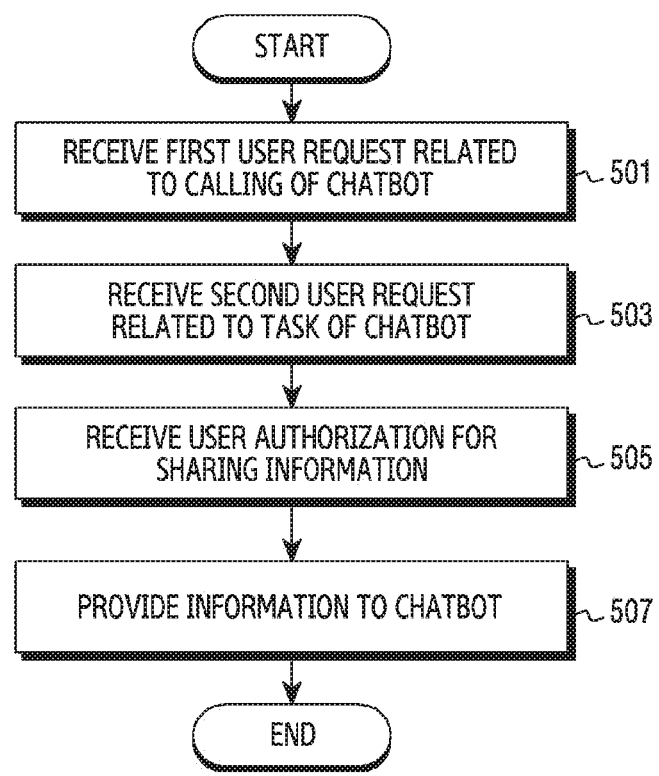
FIG. 5 illustrates an example of an operation of an electronic device according to various embodiments.

FIG. 5 illustrates an example of an operation of an electronic device according to various embodiments. The operations in FIG. 5 may be performed by at least one of the electronic device 101 or the server 108.

Referring to FIG. 5, in operation 501, the processor 120 or the processor (e.g. the chat module 230) of the server 108 may receive a first user request related to calling of a chatbot. For example, the processor 120 may receive a first user request for entering the chatting application 330 (e.g. a chat room with a chatbot) to chat with a chatbot operated by the chatbot server 201, and may transmit a signal relating to the first user request to the server 108. The processor (e.g. the chat module 230) of the server 108 may receive the signal relating to the first user request from the electronic device 101. For example, the first user request may be an input relating to a GUI of the chatting application. As another example, the first user request may be an utterance including a designated word, which is input through a microphone. However, the disclosure is not limited thereto. The processor (e.g. the chat module 230) of the server 108 may cause the chatbot of the chatbot server 201 to participate in a chat. For example, the chat module 230 may generate a chat session including the electronic device 101 and the chatbot.

In operation 503, the processor 120 or the processor (e.g. the chat module 230) of the server 108 may receive a second user request related to a task of the chatbot. The task of the chatbot may indicate, for example, a service (or a function of the chatbot) (e.g. order) to be provided to a user of the electronic device 101. For example, the task of the chatbot may be determined through an NLU module for the chatbot (NLU for chatbot), based on the second user request.

For example, the processor 120 may receive the second user request (e.g. an utterance or text of "I want to place an order") through the chatting application 330 (e.g. a chat room with the chatbot), and may transmit a signal relating to the second user request to the server 108. The processor (or the chat module 230) of the server 108 may receive the signal relating to the second user request from the electronic device 101.

According to an embodiment, the second user request (e.g. "I want to place an order") may not include at least a part (e.g. personal information or order information) of information required for performing the task (e.g. order). The second user request (e.g. "I want to place an order") may not include complete information for performing the task. For example, as at least a part of the information required for performing the task, personal information may include an address and card information, and order information may include a product name, a size, a quantity, or the date. The at least a part (e.g. personal information or order information) of information required for performing the task may be stored in at least one of the memory 130 (e.g. the personal information DB 340) of the electronic device 101 or the memory (e.g. the personal information DB 240) of the server 108.

In operation 505, the processor 120 or the processor (e.g. the chat module 230) of the server 108 may receive a user authorization for sharing the at least a part of the information required for performing the task.

For example, in various embodiments, the processor 120 may identify the at least a part of the information required for performing the task, which is stored in the memory 130 or received from the server 108. The processor 120 may output a content relating to the identified information in the chatting application 330 (e.g. a chat room with the chatbot). For example, the processor 120 may display the content relating to the identified information in the GUI of the chatting application 330, or may output same through the sound output device 155 (e.g. speaker). The processor 120 may receive a user authorization for sharing the output information with the chatbot (or the chatbot server 201).

For example, the processor 120 may receive an utterance or text of "Share it" as a user authorization through the chatting application 330 (e.g. a chat room with the chatbot) and transmit a signal relating to the user authorization to the server 108. The processor (e.g. the chat module 230) of the server 108 may receive the signal relating to the user authorization from the electronic device 101.

In operation 507, the processor 120 or the processor (e.g. the chat module 230) of the server 108 may provide the at least a part of the information required for performing the task to the chatbot (or the chatbot server 201). For example, the processor (e.g. the chat module 230) of the server 108 may transmit authorized information (e.g. personal information such as an address) to the chatbot (or the chatbot server 201) only if the processor receives the signal relating to the user authorization from the electronic device 101.

Figure 6:
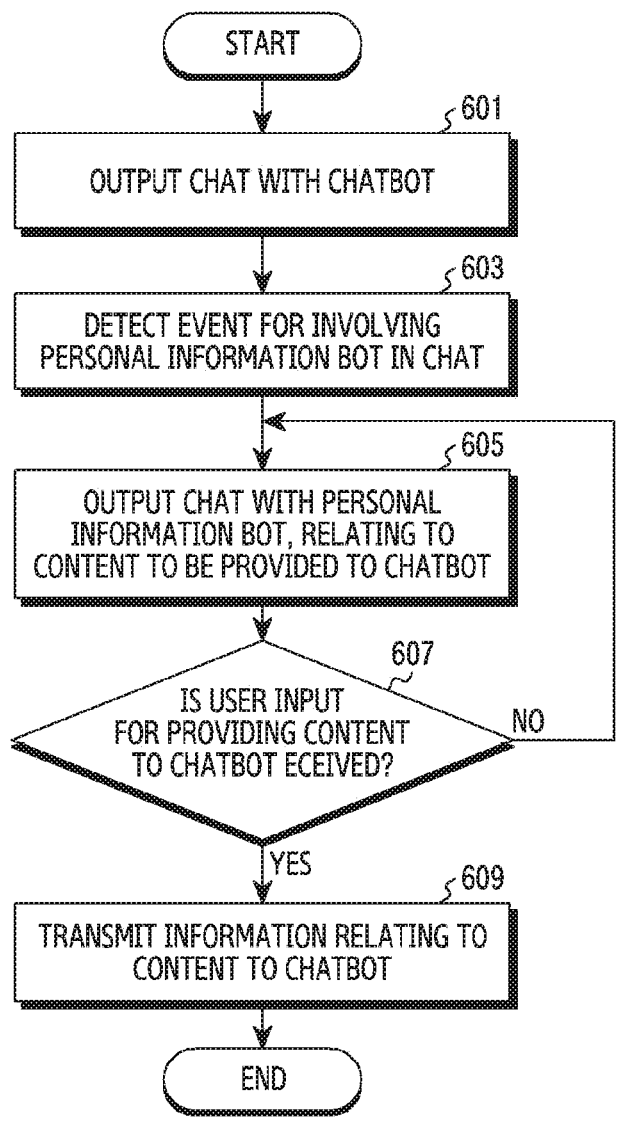
FIG. 6 illustrates another example of an operation of an electronic device according to various embodiments.
Figure 7:
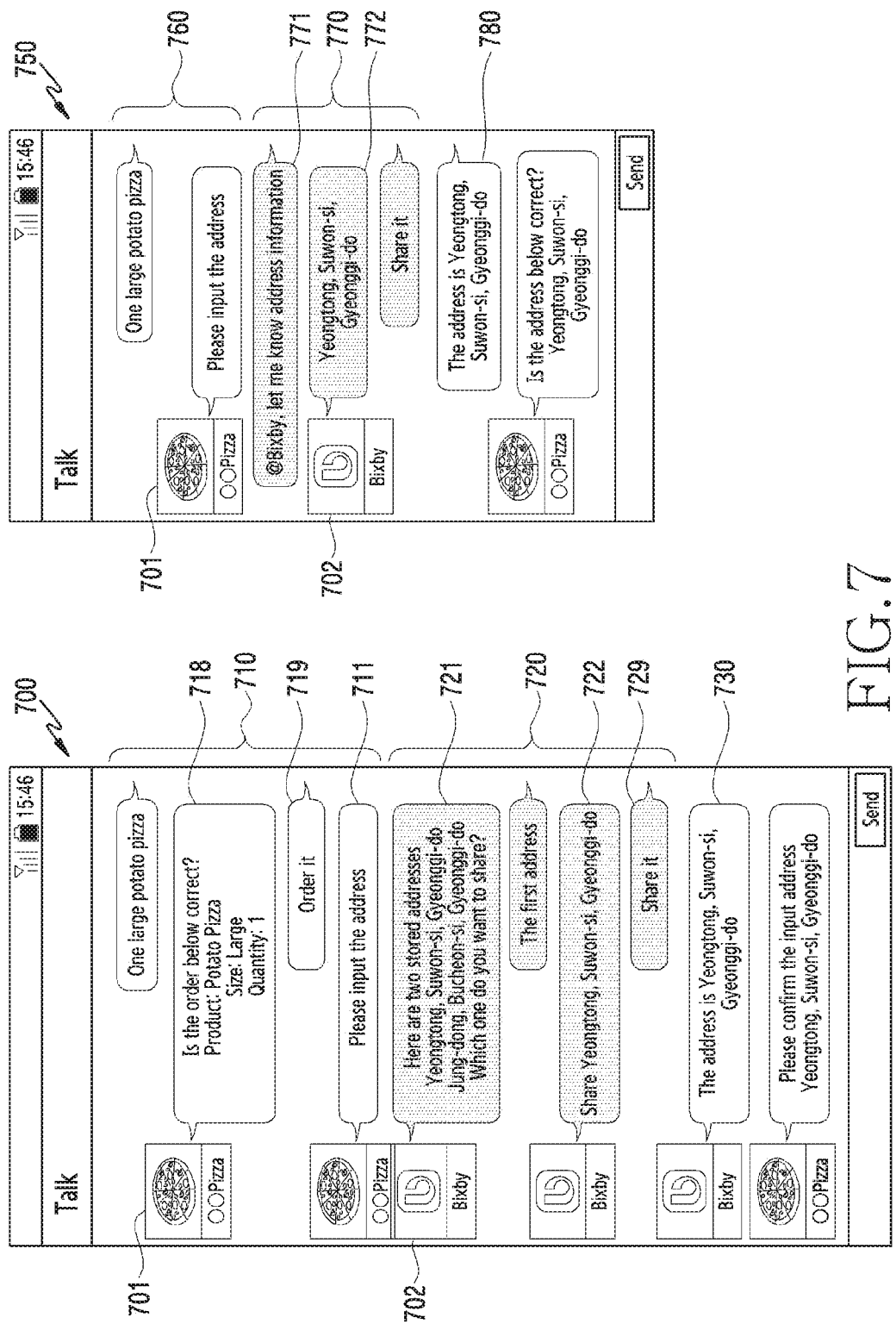
FIG. 7 illustrates an example of a graphical user interface (GUI) relating to a chatting application according to various embodiments.
Figure 8:
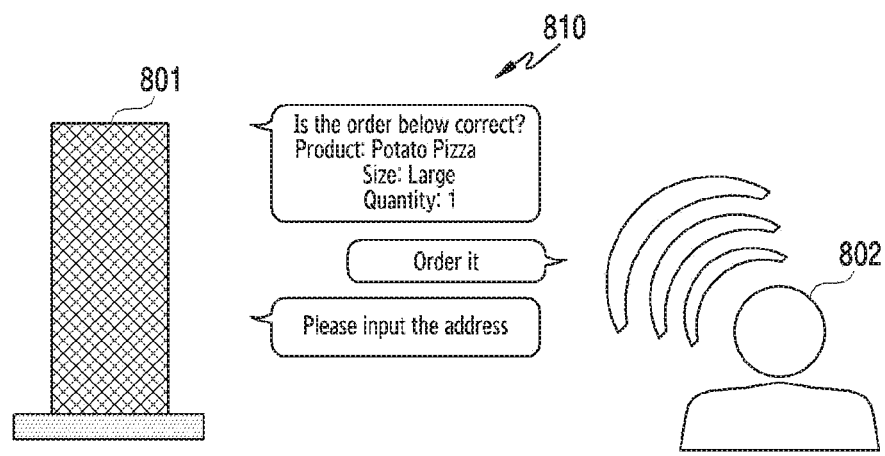
FIG. 8 illustrates an example of an artificial intelligence (AI) speaker relating to a chatting application according to various embodiments.

FIG. 6 illustrates another example of an operation of an electronic device according to various embodiments. The operations in FIG. 6 may be performed by at least one of the electronic device 101 or the server 108. FIG. 7 illustrates an example of a graphical user interface (GUI) relating to a chatting application (e.g. the chatting application 330) according to various embodiments. FIG. 8 illustrates an example of an artificial intelligence (AI) speaker relating to a chatting application (e.g. the chatting application 330) (or an artificial intelligence application) according to various embodiments.

Referring to FIG. 6, in operation 601, the processor 120 may chat with a chatbot operated by the chatbot server 201, and may output a chat with the chatbot. The chat with the chatbot may include an operation of transmitting a message (i.e. a user input) received through the input device 150 through the server 108 to the chatbot server 201, or an operation of outputting, through the output device 350, a message received through the server 108 from the chatbot server 201. Operation 601 may correspond to operation 503 and an operation performed subsequent to operation 503 in FIG. 5.

In some embodiments, referring to FIG. 7, the processor 120 may display chats 710 and 760 with a chatbot 701 through GUIs (e.g. a chat room with the chatbot) 700 and 750 relating to the chatting application 330. The chats 710 and 760 with the chatbot 701 may be based on at least one of characters or voice.

In some other embodiments, referring to FIG. 8, the electronic device 101 may include an AI speaker 801 relating to the chatting application. The processor 120 may perform a chat 810 between a user 802 and a chatbot through the AI speaker 801. The chat 810 between the user 802 and the chatbot may be based on voice. The processor 120 may transmit the voice of the user 802, received through a microphone through the server 108 to the chatbot server 201 (or the chatbot), and output a message received through the server 108 from the chatbot server 201 (or the chatbot) through the AI speaker 801.

In operation 603, the processor 120 may detect an event for involving a personal information bot (PI bot) (e.g. a personal information bot 702 in FIG. 7) in a chat with the chatbot 701. The personal information bot may be used for a chat relating to a content (e.g. personal information and order information) to be provided to the chatbot 701 in a user interface relating to the chatting application 330.

In some embodiments, referring to the GUI (e.g. a chat room for the chatbot) 700 in FIG. 7, the processor 120 may detect an event for involving the personal information bot 702 in a chat, based on the chat 710 with the chatbot 701. For example, the processor 120 or the processor of the server 108 may detect an event for involving the personal information bot 702 in a chat by identifying a designated word or phrase (e.g. "the address" included in a message 711) from the chat 710 with the chatbot 701. As another example, the processor of the server 108 may monitor the intent of the chat 710 by using an NLU module for the chatbot 701. The processor of the server 108 may identify the intent of the message 711 included in the chat 710 as intent to input an address by using the NLU module for the chatbot 701, and may transmit a signal relating to the intent to input the address to the electronic device 101. The processor 120 may receive the signal relating to the intent to input the address from the server 108, thereby detecting an event for involving the personal information bot 702 in a chat.

In some other embodiments, referring to the GUI (e.g. a chat room for the chatbot) 750 in FIG. 7, at least one of the processor 120 or the processor of the server 108 may detect an event for involving the personal information bot 702 in a chat, based on reception of a designated word (e.g. "Bixby"). For example, the server 108 may not transmit information relating to a message 771 received from a user to the chatbot server 201 (or the chatbot 701), based on identification of the word "Bixby" included in the message 771.

In yet some other embodiments, the processor 120 may receive a user input (e.g. an input relating to a physical button, or an input relating to an icon) for calling the personal information bot 702, thereby detecting an event for involving the personal information bot 702 in a chat.

Although not illustrated, the AI speaker 801 relating to the chatting application in FIG. 8 may also detect an event for involving a personal information bot (e.g. the personal information bot 702) in a chat by using various methods as described above. For example, the server 108 may receive, from the electronic device 101, a signal for involving a personal information bot (e.g. the personal information bot 702) in a chat.

In operation 605, the processor 120 may output a chat with a personal information bot (e.g. the personal information bot 702), based on detection of an event for involving the personal information bot in a chat. The chat with the personal information bot (e.g. the personal information bot 702) may be a chat relating to a content (e.g. personal information or order information) to be provided to a chatbot (e.g. the chatbot 701). The chat with the personal information bot may be based on an NLU module for personal information (NLU for PI) of the server 108. The chat with the personal information bot may be based on at least one of the personal information DB 240 of the server 108 or the personal information DB 340 of the electronic device 101.

For example, referring to FIG. 7, the processor 120 may display chats 720 and 770 with the personal information bot 702 through the GUIs (e.g. a chat room with the chatbot) 700 and 750 relating to the chatting application 330. The chats 720 and 770 with the personal information bot 702 may be based on at least one of characters or voice. Although not illustrated, the AI speaker 801 relating to the chatting application in FIG. 8 may also output a chat with the personal information bot (e.g. the personal information bot 702) in the form of voice.

For example, the processor 120 or the processor of the server 108 may identify information (e.g. an address) to be provided to the chatbot 701, from a chat (e.g. a message 711 or 771) through the chatting application 330. The processor 120 or the processor of the server 108 may identify (or retrieve) a content (e.g. an address) corresponding to the identified information from the personal information DB 240 or the personal information DB 340. The processor 120 may output the chats 720 and 770 with the personal information bot 702, relating to the content to be provided to the chatbot 701.

The processor 120 or the processor of the server 108 may not transmit information relating to the chats 720 and 770 with the personal information bot 702 to the chatbot 701 (or the chatbot server 201) during the chats 720 and 770 with the personal information bot 702. Therefore, during the chats with the personal information bot 702, information (e.g. information 721, 722, and 772) relating to a content to be provided to the chatbot 701 may not be transmitted to the chatbot 701 (or the chatbot server 201). The prevention of transmission of information relating to a chat with a personal information bot to the chatbot server can maintain the security of personal information and prevent incorrect operation of the chatbot.

According to an embodiment, the processor 120 or the processor of the server 108 may call a personal information bot even in a chat with users of other electronic devices using the chatting application 330, as well as a chat with a chatbot. The processor 120 or the processor of the server 108 may detect an event for involving a personal information bot during a chat with users of other electronic devices. The processor of the server 108 may operate, based on detection of the event, a personal information bot to chat with the user of the electronic device 101 by using an NLU module for personal information. The personal information bot operated by the server 108 may perform a chat relating to personal information of the user of the electronic device 101. The chat between the user of the electronic device 101 and the personal information bot may not be transmitted to the users of the other electronic devices. The processor 120 or the processor of the server 108 may transmit personal information to other electronic devices, based on reception of a user authorization for transmitting the personal information to the other electronic devices.

Although not illustrated, the AI speaker 801 relating to the chatting application in FIG. 8 may also perform an operation corresponding to the operation described above. For example, the processor 120 of the AI speaker 801 may detect an event for involving a personal information bot (e.g. the personal information bot 702) during a voice-based chat with a chatbot (e.g. the chatbot 701). The processor 120 may involve a personal information bot (e.g. the personal information bot 702) during a chat with a chatbot (e.g. the chatbot 701), based on detection of the event. The processor 120 of the AI speaker 801 may transmit a user input received through a microphone to the server 108, and output, as a voice, a response message of a personal information bot, transmitted from the server 108, through the AI speaker 801. The processor 120 of the AI speaker 801 may not transmit data relating to a chat with the personal information bot, relating to personal information, to the chatbot server 201 (or a chatbot, e.g. the chatbot 701). The processor 120 of the AI speaker 801 may transmit personal information to the chatbot server 201, based on reception of a user authorization for transmitting the personal information to the chatbot server 201. A detailed description relating to a chat with a personal information bot through the AI speaker 801 will be given below with reference to FIGS. 11 and 12.

In operation 607, the processor 120 may identify whether or not the processor receives a user input for providing the content to the chatbot (or the chatbot server 201). For example, referring to FIG. 7, the user input for providing the content to the chatbot 701 may be an utterance or text input of "Share it". However, the disclosure is not limited thereto. The processor 120 may perform operation 605 until receiving the user input for providing the content to the chatbot 701. The processor 120 may output the chats 720 and 770 with the personal information bot 702 until receiving the user input for providing the content to the chatbot 701.

In operation 609, the processor 120 may transmit information relating to the content to the chatbot, based on reception of the user input for providing the content to the chatbot. The reception of the user input in operation 607 may correspond to reception of a user input authorization in operation 505 in FIG. 5. The transmission of the information relating to the content in operation 609 may correspond to the provision of information to the chatbot in operation 507 in FIG. 5.

For example, the processor 120 may output, in the GUI 700 (e.g. a chat room with the chatbot 701), provision 730 of information relating to the content (e.g. an address) to the chatbot 701 by the personal information bot 702. In another example, the processor 120 may also output, in the GUI 750 (e.g. a chat room with the chatbot 701), provision 780 of the information relating to the content to the chatbot 701 by the user. The message 780 may be not based on a user input. The processor 120 may generate a message 730 or 780, based on reception of a user input (e.g. "Share it") for providing the content to the chatbot 701.

The processor 120 may also perform additional authentication for providing the content (e.g. personal information or order information) to the chatbot server 201. The processor 120 may perform additional authentication for providing the content to the chatbot 701, based on at least one of voice information, iris information, face recognition information, fingerprint information, or the password of the user of the electronic device 101. For example, the processor 120 may obtain voice information for seamless authentication from a user input (e.g. the utterance "Share it") for providing the content to the chatbot server 201. The processor 120 may authenticate the user input, based on identification that the voice information obtained from the user input corresponds to the voice of the user of the electronic device 101. The processor 120 may receive a user input for providing a content to the chatbot server 201, and may provide (or transmit) the content to the chatbot 701, based on performing authentication as described above.

In various embodiments, the content to be provided to the chatbot 701 may include order information as well as personal information such as an address. For example, at least one of the personal information DB 240, the personal information DB 340, or a DB included in the chatbot server 201 or connected to the chatbot server 201 may store an order record for each user (e.g. each user ID). The processor 120 or the processor of the server 108 may provide order information to the chatbot 701 from the stored order record. A detailed description relating to an example of an operation of providing order information to the chatbot 701 as a content will be given below with reference to FIGS. 16 to 18.

In various embodiments, the processor 120 or the processor of the server 108 may confirm (or determine) information (e.g. personal information and order information) to be provided to a chatbot, through a chat (e.g. a chat 710, 720, 760, or 770) with the chatbot (e.g. the chatbot 701) or a personal information bot (e.g. the personal information bot 702). According to an embodiment, the processor 120 or the processor of the server 108 may determine information (e.g. information 718 and 722) to be provided to a chatbot (e.g. the chatbot 701), based on a user input (e.g. a user input 719 or 729) during a chat with the chatbot (e.g. using a keyword or an NLU module for the chatbot). For example, referring to the GUI (e.g. a chat room with the chatbot) 700, the processor 120 may confirm order information 718 in the chat 710 with the chatbot 701, based on a user input 719 of "Order it". The processor 120 may confirm address information 722, based on a user input 729 of "Share it" in the chat 720 with the personal information bot 702.

The processor 120 may transmit confirmed information to the chatbot server 201 through the server 108.

In some embodiments, the processor 120 may transmit confirmed information to a chatbot (or the chatbot server 201) through a chat room (i.e. a chat session, which is managed in the chat module 230 of the server 108, between the electronic device 101 and the chatbot (e.g. the chatbot 701)) with the chatbot (e.g. the chatbot 701). For example, the processor 120 may transmit a message (e.g. the message 718 or 730) relating to confirmed information through a chat room with a chatbot (e.g. the chatbot 701) to the server 108. The server 108 may transmit a message (e.g. the message 718 or 730) relating to the information to the chatbot (or the chatbot server 201) through a chat session between the chatbot (e.g. the chatbot 701) and the electronic device 101. For example, the chatbot server 201 may extract a parameter required for performing a task (e.g. a function relating to ordering) of the chatbot from a message received through the chat session, by using the NLU module for the chatbot. For example, the chatbot 701 (or the chatbot server 201) may extract "Yeongtong, Suwon-si, Gyeonggi-do" as an address parameter from the message 730, and extract a parameter such as a product name, size, and quantity from the message 718.

In some other embodiments, an application programming interface (API) allowing sharing of a designated parameter may be configured between the chatbot and the chatting application 330 (or the chat module 230 of the server 108) of the electronic device 101. The processor 120 or the processor (e.g. the chat module 230) of the server 108 may share a designated parameter with the chatbot 701 (or the chatbot server 201) through a chat session by using the API.

The chatbot 701 of the chatbot server 201 may perform a task (e.g. a function relating to ordering) of the chatbot 701 by using information (or a content) provided through the server 108 from the electronic device 101.

Figure 9:
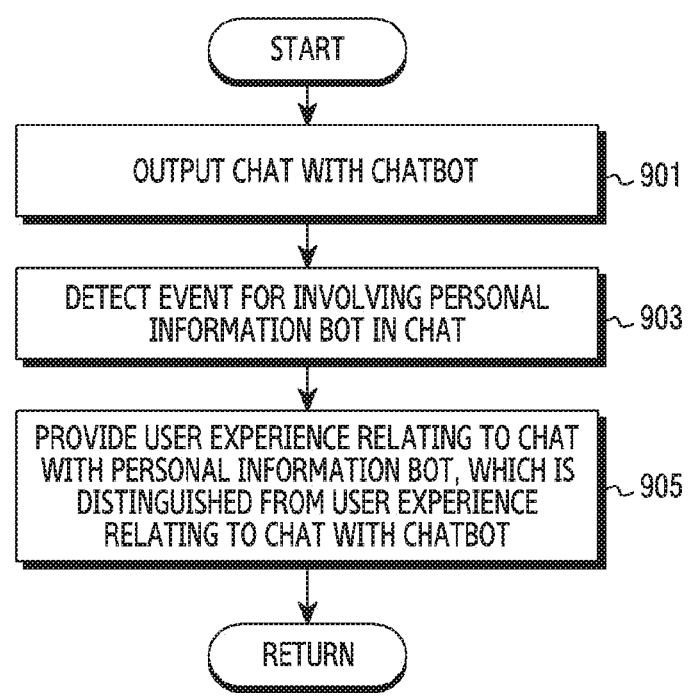
FIG. 9 illustrates an example of an operation of an electronic device for outputting a chat with a personal information bot in a scheme different from that of a chat with a chatbot, according to various embodiments.
Figure 10:
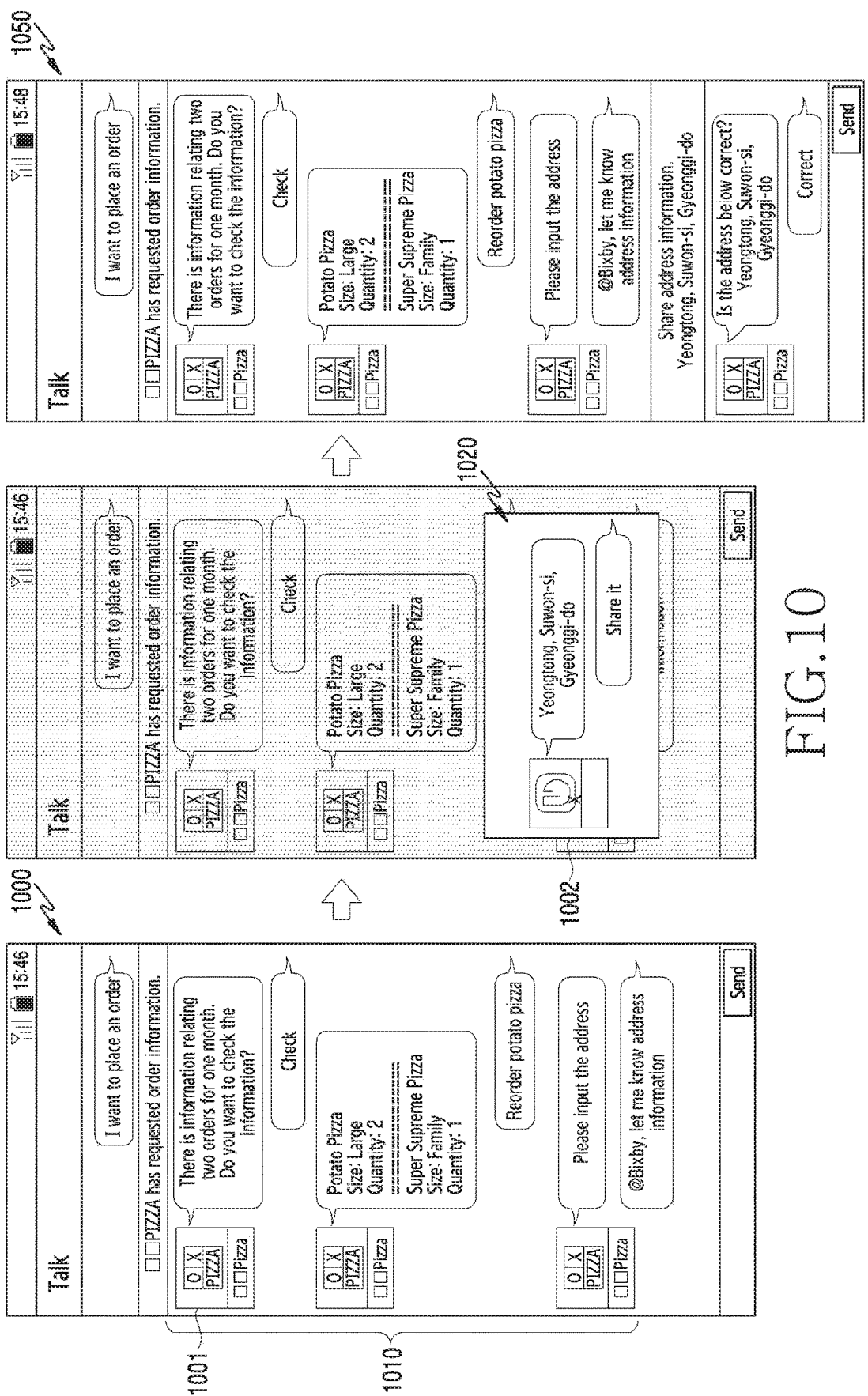
FIG. 10 illustrates an example of a GUI for outputting a chat with a personal information bot in a scheme different from that of a chat with a chatbot in an electronic device according to various embodiments.
Figure 11:
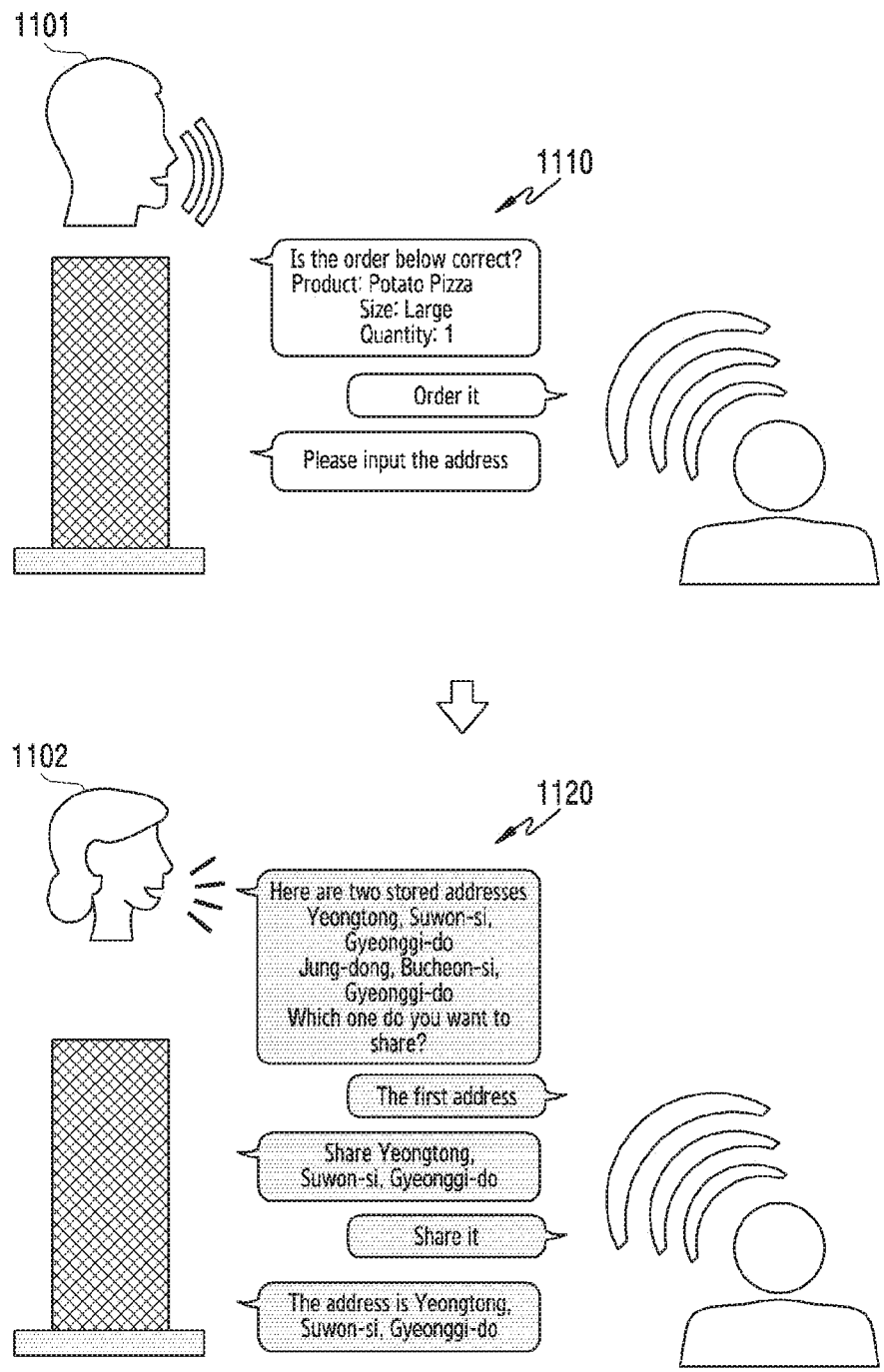
FIG. 11 illustrates an example of an AI speaker for outputting a chat with a personal information bot in a scheme different from that of a chat with a chatbot according to various embodiments.
Figure 12:
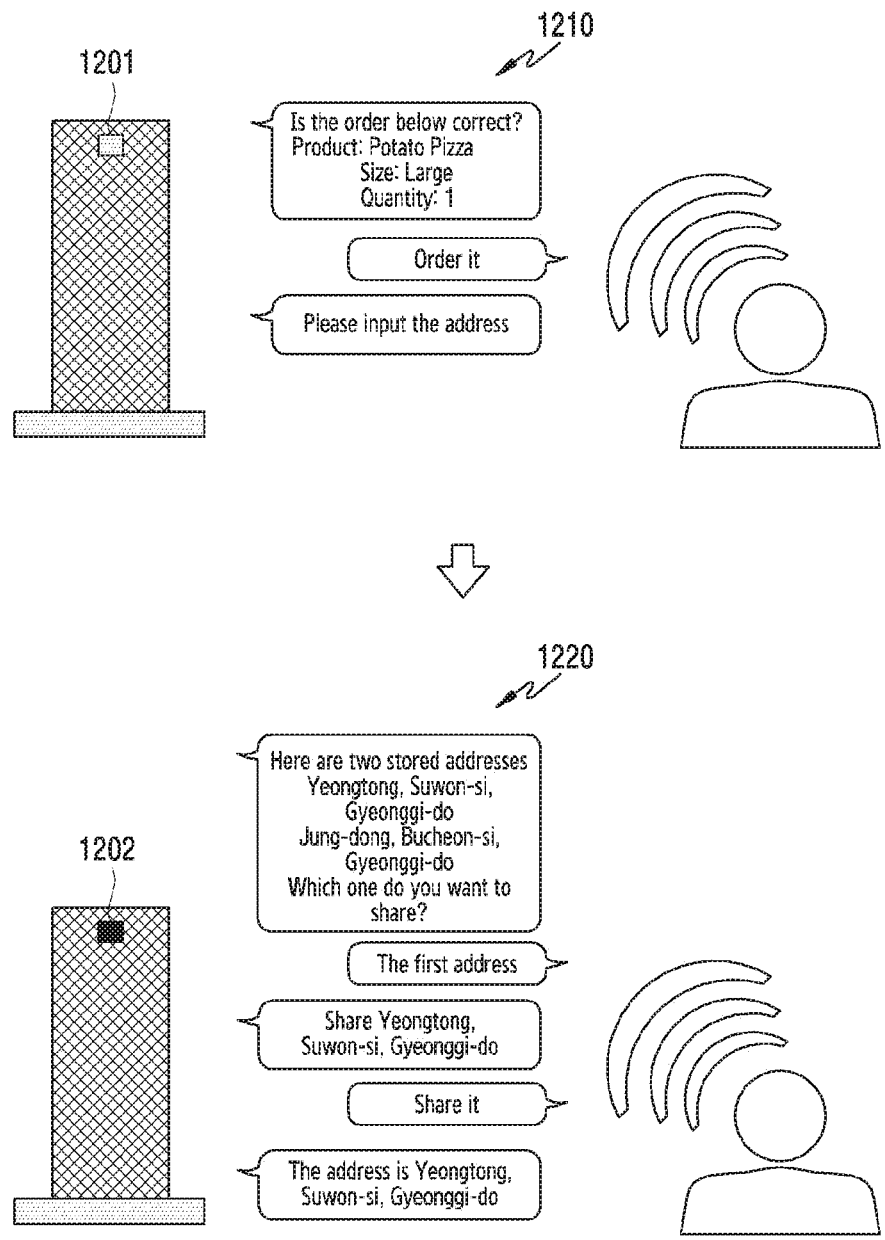
FIG. 12 illustrates another example of an AI speaker for outputting a chat with a personal information bot in a scheme different from that of a chat with a chatbot according to various embodiments.

FIG. 9 illustrates an example of an operation of an electronic device for outputting a chat with a personal information bot in a scheme different from that of a chat with a chatbot, according to various embodiments. The operations in FIG. 9 may be performed by the electronic device 101. According to an embodiment, a part of an operation (e.g. operation 903) in FIG. 9 may be performed by the server 108. FIG. 10 illustrates an example of a GUI for outputting a chat with a personal information bot in a scheme different from that of a chat with a chatbot in an electronic device according to various embodiments. FIG. 11 illustrates an example of an AI speaker for outputting a chat with a personal information bot in a scheme different from that of a chat with a chatbot according to various embodiments. FIG. 12 illustrates another example of an AI speaker for outputting a chat with a personal information bot in a scheme different from that of a chat with a chatbot according to various embodiments.

Operations 901, 903, and 905 in FIG. 9 may be included in operations 601, 603, and 605 in FIG. 6. Operations in FIG. 9 may indicate a subordinate embodiment of operation 605 of outputting a chat with a personal information bot in FIG. 6.

Referring to FIG. 9, in operation 901, the processor 120 may output a chat with a chatbot. Operation 901 may correspond to operation 601 in FIG. 6.

For example, referring to FIG. 7, the processor 120 may output the chats 710 and 760 with the chatbot 701. As another example, referring to FIG. 10, the processor 120 may output a chat 1010 with a chatbot 1001. As yet another example, referring to FIG. 11 or 12, the processor 120 may output a chat 1110 with a chatbot or a chat 1210 with a chatbot.

In operation 903, the processor 120 or the processor of the server 108 may detect an event for involving a personal information bot (e.g. the personal information bot 702) in a chat (e.g. the chat 710, 760, 1010, 1110, or 1210). Operation 903 may correspond to operation 603 in FIG. 6.

In operation 905, the processor 120 may provide a user experience relating to a chat with a personal information bot (e.g. the personal information bot 702 or 1002), which is distinguished from a user experience relating to a chat (e.g. the chat 710, 760, 1010, 1110, or 1210) with a chatbot (e.g. the chatbot 701 or 1001). Operation 905 may correspond to operation 605 in FIG. 6.

For example, referring to FIG. 7, the processor 120 may display the chats 720 and 770 with the personal information bot 702 in a color different from that of the chats 710 and 760 with the chatbot 701 in the GUIs (e.g. a chat room with the chatbot) 700 and 750.

As another example, referring to FIG. 10, the processor 120 may display a chat 1020 with the personal information bot 1002, which is superimposed on a GUI (e.g. a chat room with the chatbot) 1000. The processor 120 may display the chat 1020 with the personal information bot 1002 by using a layer (e.g. a pop-up window) distinguished from the GUI 1000 (or a chat room with the chatbot 1001).

As another example, referring to FIG. 11, the processor 120 may output a message 1120 of a personal information bot in a voice different from that of the chatbot. For example, the processor 120 may output the message 1110 of the chatbot in a voice of a male 1101 and the message 1120 of the personal information bot in a voice of a female 1102. However, the disclosure is not limited thereto. For example, the processor 120 may output the message 1120 of the personal information bot to be different from the message 1110 of the chatbot, based on at least one of accent, tempo, the voice of an old man, the voice of a child, the voice of a male, or the voice of a female.

As yet another example, referring to FIG. 12, the processor 120 may output a color 1201 through a display part (e.g. a light-emitting diode (LED)) during the chat 1210 with the chatbot. The processor 120 may output a color 1202 different from the color 1201 through the display part (e.g. LED) during a chat 1220 with a personal information bot. However, the disclosure is not limited thereto. For example, the processor 120 may output the message 1220 of the personal information bot to be different from the message 1210 of the chatbot, based on the strength or color of light output through a bulb connected to the electronic device 101 (e.g. an AI speaker).

The processor 120 may return to operation 607 in FIG. 6 after operation 905. For example, referring to FIG. 10, while the processor 120 is displaying the chat 1020 with the personal information bot 1002, the processor may remove a layer (e.g. a pop-up window) for displaying the chat 1020 with the personal information bot 1002, based on reception of a user input (e.g. a user utterance or text input of "Deliver it") for providing a content (e.g. an address) to the chatbot 1001. The processor 120 may continuously chat with the chatbot 1001 as shown in a GUI (e.g. a chat room with a chatbot) 1050, based on reception of the user input. The GUI (e.g. a chat room with a chatbot) 1050 may not include a chat (e.g. the chat 1020) with the personal information bot 1002.

For example, a chat (e.g. the chat 720, 770, 1020, 1120, or 1220) with a personal information bot (e.g. the personal information bot 702 or 1002) may be performed through a session different from a chat session with a chatbot (e.g. the chatbot 701 or 1001) in the chat module 230 of the server 108. For example, the chat module 230 (or the processor) of the server 108 may generate (or temporarily generate) a session different from a chat session with a chatbot to allow a chat with a personal information bot. A chat with a personal information bot is performed through a session different from a chat session with a chatbot, so that the chat with the personal information bot may not be transmitted to a chatbot (e.g. the chatbot 701 or 1001) (or the chatbot server 201). The chat with the personal information bot may be output to the electronic device 101 as though the personal information bot were participating in a chat session with the chatbot.

Figure 13:
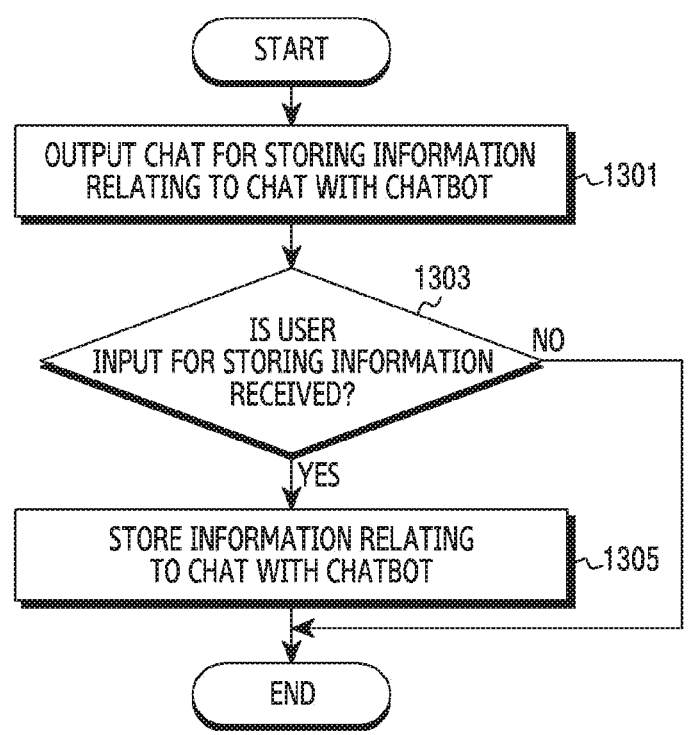
FIG. 13 illustrates an example of an operation for storing information relating to a chat with a chatbot in an electronic device according to various embodiments.
Figure 14:
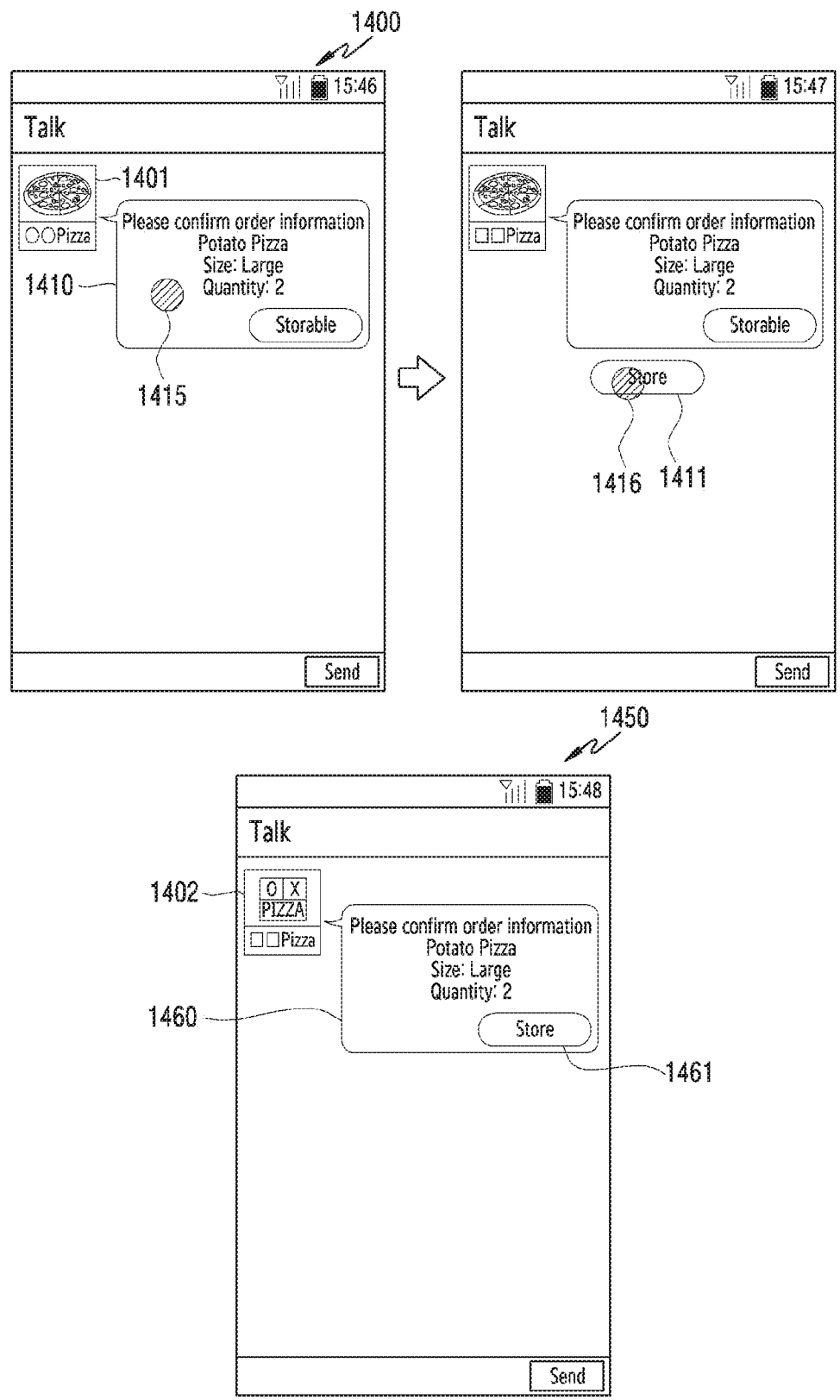
FIG. 14 illustrates an example of a GUI for storing information relating to a chat with a chatbot in an electronic device according to various embodiments.

FIG. 13 illustrates an example of an operation for storing information relating to a chat with a chatbot in an electronic device according to various embodiments. The operations in FIG. 13 may be performed by the electronic device 101. According to an embodiment, a part of an operation (e.g. operation 1305) in FIG. 13 may be performed by the server 108. FIG. 14 illustrates an example of a GUI for storing information relating to a chat with a chatbot in an electronic device according to various embodiments.

Referring to FIG. 13, in operation 1301, the processor 120 may output a chat for storing information (e.g. order information) relating to a chat with a chatbot. For example, the chat for storing the information may correspond to the message 718 in FIG. 7, or may be output after operation 507 (or operation 609 in FIG. 6) in FIG. 5.

For example, referring to FIG. 14, the processor 120 may output a message 1410 or 1460 for storing order information in a GUI 1400 or 1450 displaying a chatroom with a chatbot 1401 or 1402. For example, the processor 120 may output the message 1410 indicating that the information included in the message 1410 is storable. As another example, the processor 120 may output the message 1460 including an object 1461 (or a button or an icon) used for storing the information included in the message 1410.

In operation 1303, the processor 120 may identify whether or not the processor receives a user input for storing the information. The processor 120 may terminate the procedure, based on non-reception of a user input for storing the information. For example, the processor 120 may not store the information, and may continue chatting with the chatbot 1401 or 1402 or a personal information bot.

In operation 1305, the processor 120 may store the information relating to the chat with the chatbot, based on reception of a user input for storing the information.

For example, referring to FIG. 14, the processor 120 may output an object 1411 allowing storage of the information included in the message 1410 in the GUI (e.g. a chat room with a chatbot) 1400 in response to reception of an input 1415 (e.g. a long-press or a hovering input) relating to the message 1410. The processor 120 may store the information included in the message 1410, based on reception of an input 1416 relating to the object 1411. The processor 120 may store information included in the message 1460 in the GUI 1450, based on reception of an input relating to the object 1461 included in the message 1460.

In some embodiments, the processor 120 may store the information included in the message 1410 in the memory 130 (e.g. the personal information DB 340). In some other embodiments, the processor 120 may transmit the information included in the message 1410 to the server 108 so as to store the information in the personal information DB 240 of the server 108 or the DB of the chatbot server 201. According to an embodiment, the processor 120 may share the information included in the message 1410 or 1460 with a user of another electronic device, based on a user input.

A detailed description relating to information (e.g. order information) relating to a chat with a chatbot, which is stored in the personal information DB 240 or 340, will be given below in Table 2.

TABLE 2

| | | |
|---|---|---|
| . | . | |
| . | . | |
| . | . | |
| session ID: 12752 | . | |
| | . | |
| | . | |
| session ID: 78954 | intent ID | ID 256785 |
| | @prod | Potato pizza |
| | @size | large |
| | @num | 2 |
| | @date | 12th of Aug |
| | intent ID | ID 256785 |
| | @prod | Super supreme pizza |
| | @size | family |
| | @num | 1 |
| | @date | 27th of Aug |
| | intent ID | ID 337754 |
| | @Prod | Buffalo wings |
| | @num | 1 |
| | @date | 27th of Aug |

Table 2 shows an example of a personal information DB storing information relating to a function of a chatbot according to various embodiments. The personal information DB of Table 2 may be stored in at least one of the memory 130 (e.g. the personal information DB 340) of the electronic device 101, the memory (e.g. the personal information DB 240) of the server 108, or a DB included in the chatbot server 201 or connected to the chatbot server 201.

Referring to Table 2, the personal information DB 240 or 340 may show, for example, information stored for the user of the electronic device 101.

The personal information DB 240 or 340 may store information for each session ID. A session ID may be assigned to each chatbot. The session ID may be used to distinguish a chatbot (e.g. the chatbot 701) from another chatbot (e.g. the chatbot 1001). For example, session ID 78954 may be identification information indicating a chatbot (e.g. the chatbot 701) relating to OO Pizza. For example, session ID 12752 may be identification information indicating a chatbot (e.g. the chatbot 1001 or a shopping mall chatbot) different from a chatbot (e.g. the chatbot 701). Each of a plurality of chatbots may identify information stored by the each of the plurality of chatbots or information usable by the each of the plurality of chatbots by using a corresponding session ID. In the information stored by the each of the plurality of chatbots, the structure of parameters or information may be different.

The personal information DB 240 or 340 may store information according to intent for each session ID. For example, in a session (i.e. session ID 78954) related to a chatbot (e.g. the chatbot 701), intent ID 256785 may show intent relating to a pizza order. Intent ID 337754 may show intent relating to a side dish order. For example, a chatbot may identify that a user's intent is intent (i.e. intent ID 256785) relating to a pizza order, from a user input (e.g. an utterance or a text input) of "Order two large potato pizzas". The chatbot may identify a parameter (e.g. a product name, a size, a quantity, and the date) for performing a function relating to the intent (i.e. intent ID 256785) from the user input. For example, the chatbot may identify an intent or a parameter by using an NLU module for the chatbot, which is stored in the chatbot server 201 or the server 108. The chatbot (or the chatbot server 201) may identify the date parameter as the current date if the chatbot cannot identify the date parameter from the user input. According to an embodiment, intent identifiable by a chatbot may include intent relating to order confirmation, and intent relating to a call center as well as intent relating to a pizza order or intent relating to a side dish order.

Figure 15:
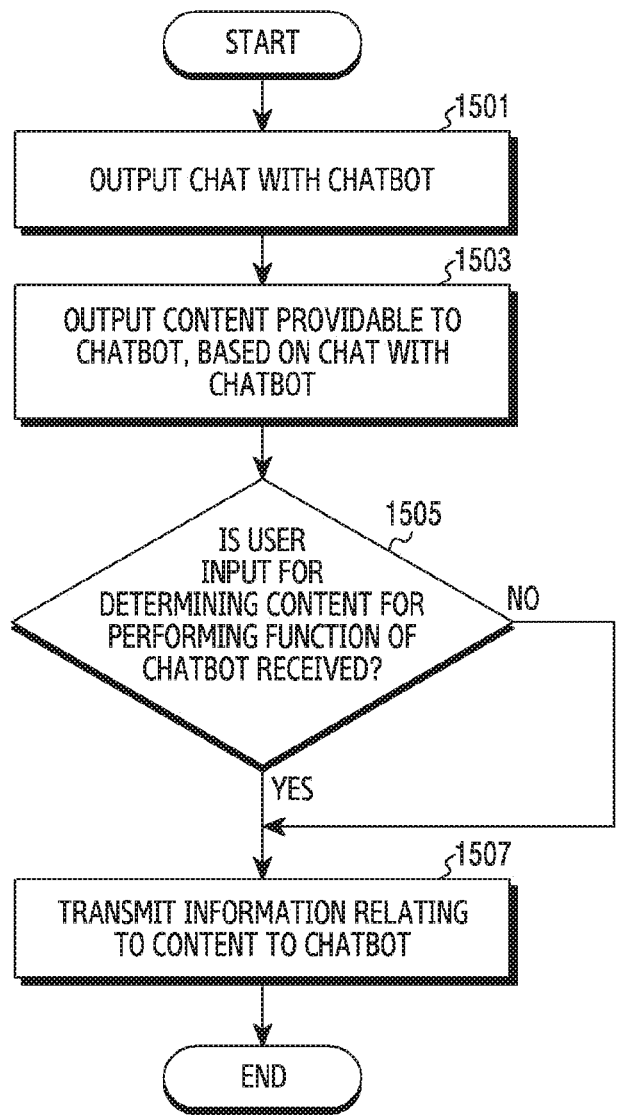
FIG. 15 illustrates an example of an operation for outputting a content providable to a chatbot in an electronic device according to various embodiments.
Figure 16:
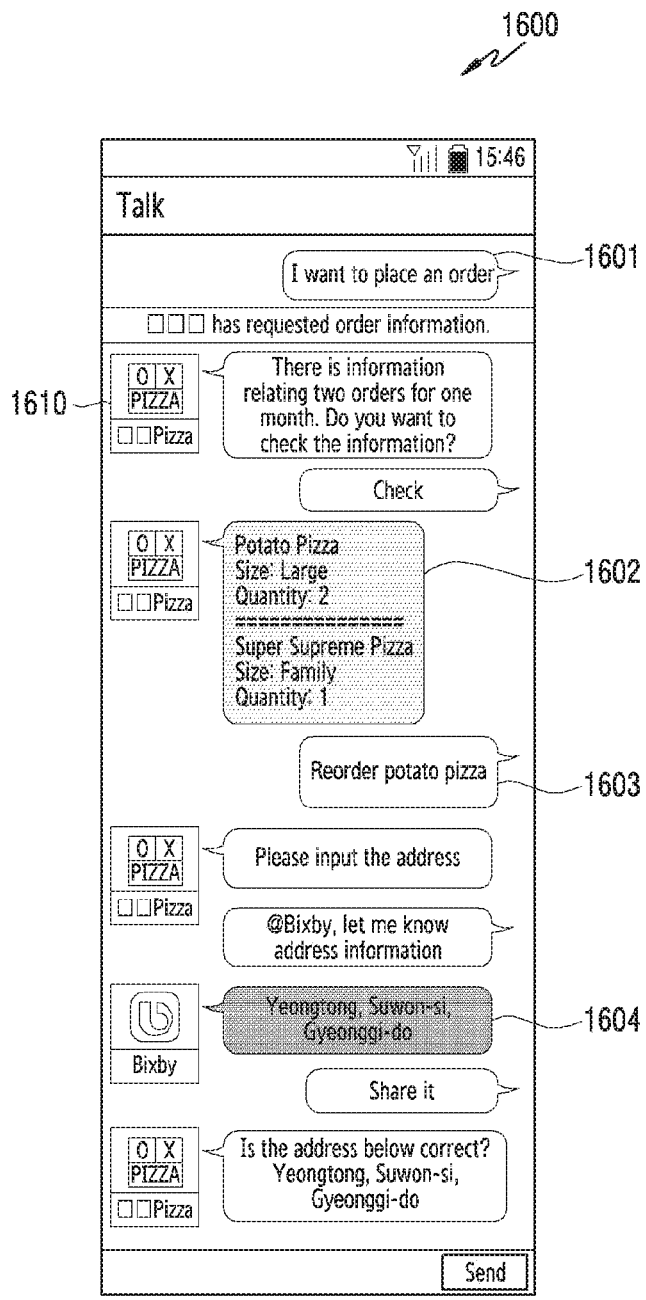
FIG. 16 illustrates an example of a GUI outputting a content providable to a chatbot according to various embodiments.
Figure 17:
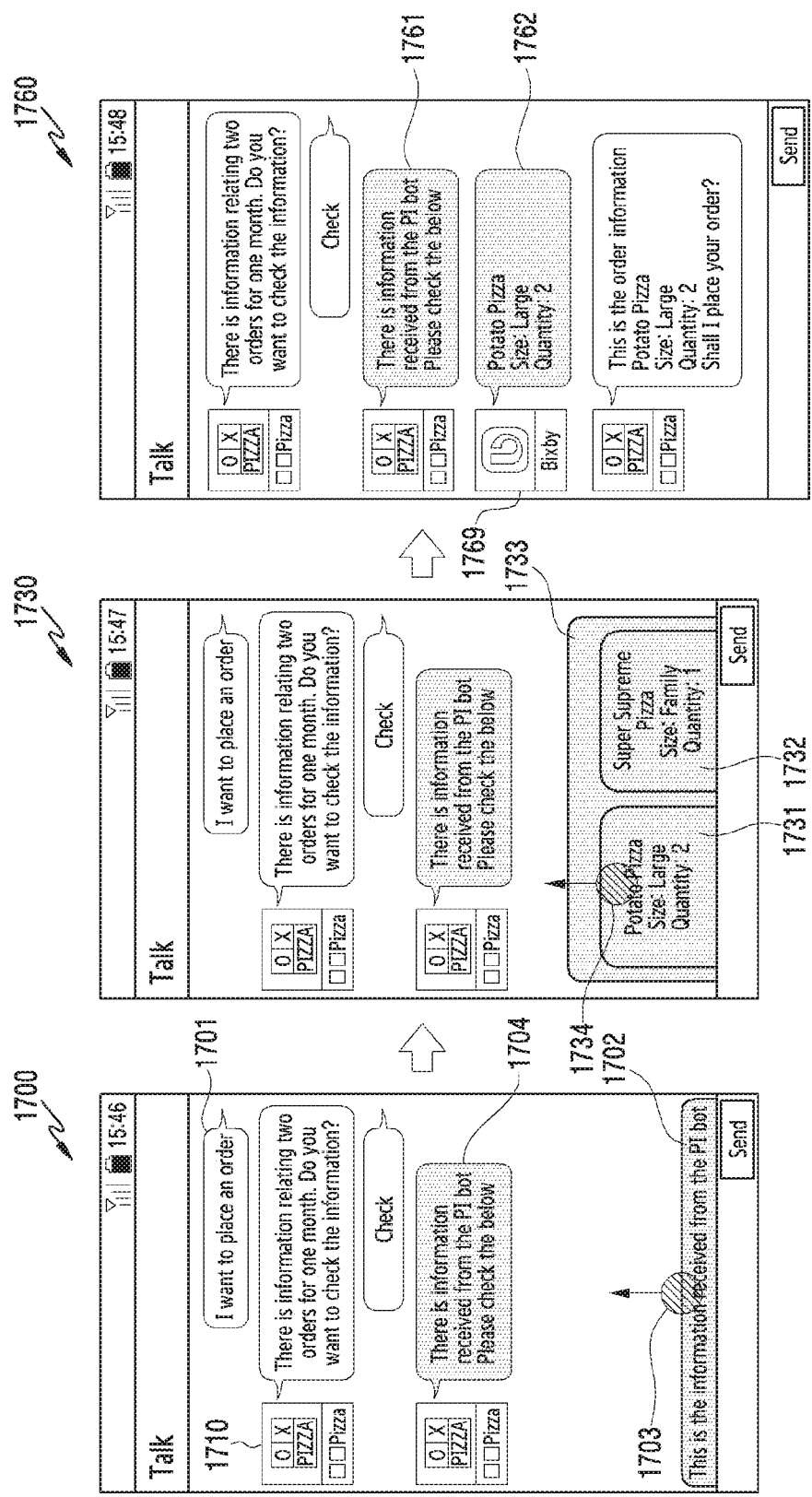
FIG. 17 illustrates another example of a GUI outputting a content providable to a chatbot according to various embodiments.

FIG. 15 illustrates an example of an operation for outputting a content providable to a chatbot in an electronic device according to various embodiments. The operations in FIG. 15 may be performed by at least one of the electronic device 101 or the server 108. FIG. 16 illustrates an example of a GUI (e.g. a chat room with a chatbot) outputting a content providable to a chatbot according to various embodiments. FIG. 17 illustrates another example of a GUI (e.g. a chat room with a chatbot) outputting a content providable to a chatbot according to various embodiments.

Referring to FIG. 15, in operation 1501, the processor 120 may output a chat with a chatbot. Operation 1501 may correspond to operation 601 in FIG. 6. For example, referring to FIGS. 16 and 17, the processor 120 may output a chat with a chatbot 1610 or 1710 through a screen 1600 or 1700 (e.g. a chat room with the chatbot 1610 or 1710) of the chatting application 330.

In operation 1503, the processor 120 may output a content providable to the chatbot, based on the chat with the chatbot. The content providable to the chatbot may be a content allowing performance of a function (e.g. order) of the chatbot, corresponding to a user's intent.

For example, the chatbot server 201 (or the server 108) may identify the intent of a user input received through a chat session of the electronic device 101 by using an algorithm based on a keyword or an NLU module for the chatbot. For example, the chatbot server 201 (or the server 108) may identify an order intent from a user input 1601 in FIG. 16. The chatbot server 201 (or the server 108) may identify a pizza order intent from a user input 1701 in FIG. 17.

At least one of the chatbot server 201, the server 108, or the processor 120 may retrieve information corresponding to an identified intent from at least one of the DB connected to the chatbot server 201, the personal information DB 240, or the personal information DB 340. For example, at least one of the chatbot server 201, the server 108, or the processor 120 may identify a content providable to the chatbot from the personal information DB 240 or 340 in Table 2, based on a session ID related to the chatbot and intent ID of a pizza order. The processor 120 may output information relating to a content providable to the chatbot, which allows performance of a function of the chatbot, corresponding to a user's intent.

For example, referring to FIG. 16, the processor 120 may output information 1602 relating to a content providable to the chatbot 1610, based on the order intent of the user input 1601. The content providable to the chatbot 1610 in the information 1602 may be determined based on an intent (i.e. intent ID 256785) to order a pizza, for example, from the personal information DB 240 or 340 in Table 2.

For example, referring to FIG. 17, the processor 120 may output a notification window 1702 through which information 1731 and 1732 relating to a content providable to the chatbot 1710 is readable, based on the pizza order intent of the user input 1701. The processor 120 may output a notification window 1733 that is of the type of a card including the information 1731 and 1732 relating to the content, and is superimposed on a screen 1730 (e.g. a chat room with the chatbot 1710), based on reception of a user input 1703 (e.g. tap, drag, swipe-up, etc.) relating to the notification window 1702. According to an embodiment, if there are multiple contents providable to the chatbot 1710, the notification window 1733 that is of the type of a card may display another content, based on a left-right drag (or swipe) input.

For example, as illustrated in FIG. 16, information 1602 relating to the content providable to the chatbot 1610 may be output as a message of the chatbot 1610. As another example, as illustrated in FIG. 17, the notification windows 1702 and 1733 allowing reading of the information 1731 and 1732 relating to contents may be output as a message of a personal information bot.

In operation 1505, the processor 120 may identify whether or not a user input for determining a content (e.g. order information) for performing a function of the chatbot is received.

In operation 1507, based on reception of a user input for determining a content (e.g. order information) for performing a function of the chatbot, the processor 120 may transmit information relating to the determined content to the chatbot (or the chatbot server 201).

For example, referring to FIG. 16, the processor 120 may receive a user input 1603 (e.g. an utterance or text input of "Reorder a potato pizza") for determining a content for performing a function (e.g. pizza order) of the chatbot 1610. As another example, referring to FIG. 17, the processor 120 may receive a user input 1734 (e.g. tap, drag, swipe-up, etc.) for determining a content for performing a function (e.g. pizza order) of the chatbot 1710. The processor 120 may display a screen 1760, based on reception of the user input 1734.

The processor 120 may transmit the information relating to the content determined based on the user input (e.g. the user input 1603 or 1734), to the chatbot 1610 or 1710 (or the chatbot server 201) through the server 108. According to an embodiment, the processor 120 may transmit information relating to a content 1762 to the chatbot 1710 in the screen 1760 by using a personal information bot 1769.

In some embodiments, a message (e.g. the message 1602, 1704, 1733, 1761, or 1762) relating to order information to be provided to the chatbot 1610 or 1710 may be emphasized by being shown in a color different from that of other messages. In some embodiments, a message (e.g. the message 1604) relating to personal information may be emphasized by being shown in a color different from that of a message (e.g. the message 1602) relating to order information.

A system (e.g. the network environment 200) according to various embodiments as described above may include: a first electronic device (e.g. the electronic device 101) including a user interface and a communication circuit (e.g. the communication module 190); at least one processor (e.g. the processor 120 or the processor of the server 108) which is a part of the first electronic device or is configured to remotely communicate with the first electronic device; and at least one memory (e.g. the memory 130 or the memory of the server 108) residing in the first electronic device or residing outside the first electronic device. The at least one memory may store instructions causing, when executed while being operatively connected to the processor, the at least one processor to: receive a first user request related to calling of a chatbot (e.g. the chatbot 701, 1001, 1401, or 1402) in a character- and/or voice-based chat, through the user interface; cause the chatbot to join the chat; receive a second user request for a task related to the chatbot through the user interface, wherein the second user request does not include at least a part (e.g. personal information or order information) of information required for performing the task, and the at least a part of the information is stored in the at least one memory; receive a user authorization for sharing the at least a part of the information, through the user interface; and provide the at least a part of the information to the chatbot.

In various embodiments, the user interface may include at least one of a touchscreen display (e.g. the display device 160 or the display 360), a microphone (e.g. the input device 150), or a speaker (e.g. the sound output device 155).

In various embodiments, the at least one memory may be configured to store a user account, and the at least a part of the information may be related to the user account.

In various embodiments, the first electronic device (e.g. the electronic device 101) may include a first processor (e.g. the processor 120) of the at least one processor, and the system may further include a server (e.g. the server 108) including a second processor (e.g. the processor of the server 108) of the at least one processor.

For example, the instructions may cause the first processor (e.g. the processor 120) to: receive the first user request through the user interface; after the reception of the first user request, transmit data relating to the first user request to the server; receive the second user request through the user interface; and after the reception of the second user request, transmit data relating to the second user request to the server.

For example, the instructions may cause the first processor (e.g. the processor 120) to: receive the user authorization through the user interface; and provide the at least a part of the information to be provided to the chatbot.

For example, the instructions may cause the second processor (e.g. the processor of the server 108) to: receive data relating to the first user request from the first electronic device (e.g. the electronic device 101); and receive data relating to the second user request from the first electronic device.

For example, the instructions may cause the second processor (e.g. the processor of the server 108) to: receive the user authorization from the first electronic device (e.g. the electronic device 101); and provide the at least a part of the information to the chatbot.

In various embodiments, the instructions may cause the at least one processor (e.g. the processor 120 or the processor of the server 108) to: provide the user authorization and/or the at least a part of the information to another chatbot (e.g.

a personal information bot) to process the user authorization and/or the at least a part of the information.

For example, the instructions may cause the at least one processor (e.g. the processor 120 or the processor of the server 108) to: provide a third user request related to the at least a part (e.g. personal information or order information) of the information to the another chatbot (e.g. a personal information bot); while providing the third user request to the another chatbot, prevent providing of the third user request to the chatbot; and provide the at least a part of the information to the chatbot, based on reception of the user authorization.

An electronic device (e.g. the electronic device 101) according to various embodiments as described above may include: a communication module (e.g. the communication module 190); an input device (e.g. the input device 150); an output device (e.g. the output device 350, the display 360, the sound output device 155, or the display device 160); and at least one processor (e.g. the processor 120) configured to: perform a chat with a chatbot (e.g. the chatbot 701, 1001, 1401, or 1402) through a user interface relating to a chatting application, wherein the chat includes an operation of transmitting a message received through the input device to the chatbot through the communication module, or outputting a message received through the communication module from the chatbot, through the output device; during the chat, detect an event for executing at least one instruction for involving a personal information bot in the chat; using the user interface, output a chat with the personal information bot, relating to a content (e.g. personal information or order information) to be provided to the chatbot; prevent information relating to the chat with the personal information bot from being transmitted to the chatbot during the chat with the personal information bot; and transmit information relating to the content to the chatbot, based on reception of a user input for providing the information relating to the content to the chatbot.

In various embodiments, the chat with the chatbot may be performed by using a first natural-language understanding module (e.g. an NLU module for the chatbot) connected to the chatbot and configured to perform a function of the chatbot, the chat with the personal information bot may be performed by using a second natural-language understanding module (e.g. an NLU module (e.g. NLU for PI) for personal information) which is configured to perform a function of the personal information bot and is different from the first natural-language understanding module, and the at least one processor may be configured to detect, from the chat with the chatbot, an event for executing at least one instruction for involving the personal information bot in the chat, by using the second natural-language understanding module.

In various embodiments, the at least one processor may be configured to output a first message and a second message to be different from each other, based on information indicated by the first message and information indicated by the second message, among messages included in at least one of the chat with the chatbot or the chat with the personal information bot.

In various embodiments, the at least one processor may be configured to output a message relating to personal information, related to at least one of the chat with the chatbot or the chat with the personal information bot in personal information stored in a memory (e.g. the memory 130, the memory of the server 108, the personal information DB 240, or the personal information DB 340) connected to the electronic device, based on detection of an event for executing at least one instruction for involving the personal information bot in the chat.

In various embodiments, the at least one processor may be configured to provide the user interface for storing at least partial information included in the chat with the chatbot in a memory (e.g. the memory 130, the memory of the server 108, the personal information DB 240, or the personal information DB 340) connected to the electronic device.

For example, the at least one processor may be configured to output the at least partial information stored through the user interface to another chat with the chatbot.

In various embodiments, the at least one processor may be configured to execute at least one instruction for involving the personal information bot in the chat, based on at least one of: identifying intent to involve the personal information bot from the chat with the chatbot; receiving a user input including a designated word (e.g. "Bixby") in the chat with the chatbot; or receiving an input on a designated button or icon.

In various embodiments, the at least one processor may be configured to output the chat with the personal information bot, emphasized compared to the chat with the chatbot, or to output the chat with the personal information bot through a layer superimposed on a user interface to which the chat with the chatbot is output.

In various embodiments, the at least one processor may be configured to: during the chat with the personal information bot, transmit information relating to a first user input for chatting with the personal information bot to the personal information bot; prevent the information relating to the first user input from being transmitted to the chatbot; and, based on terminating the chat with the personal information bot, transmit information relating to a second user input made through a user interface to the chatbot.

An electronic device (e.g. the server 108) according to various embodiments as described above may include: a memory (e.g. the memory of the server 108); and at least one processor (e.g. the processor of the server 108) configured to: transmit a first message received from a first electronic device (e.g. the electronic device 101) to a chatbot (e.g. the chatbot 701, 1001, 1401, or 1402); transmit a response message relating to the received first message to the first electronic device, wherein the response message is obtained using a first natural-language understanding module (e.g. an NLU module for the chatbot) configured to perform a function of the chatbot; identify an event for performing a chat relating to personal information of a user of the first electronic device, based on at least one of the first message or the response message; based on the identification, perform a natural-language-based chat with the user by using a second natural-language understanding module (e.g. an NLU module for personal information (NLU for PI)) configured to perform a chat relating to personal information of the user; prevent a second message received from the first electronic device (e.g. the electronic device 101) from being transmitted to the chatbot during the chat using the second natural-language understanding module; and transmit information relating to at least a part of the second message to the chatbot, based on reception, from the first electronic device (e.g. the electronic device 101), of a signal for providing the at least a part of the second message to the chatbot.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. A system comprising:
a first electronic device including a user interface and a communication circuit;
at least one processor which is a part of the first electronic device or is configured to remotely communicate with the first electronic device; and
at least one memory residing in the first electronic device or residing outside the first electronic device,
wherein the at least one memory is configured to store instructions causing, when executed while being operatively connected to the at least one processor, the at least one processor to:
receive a first user request related to calling of a chatbot in a character- and/or voice-based chat, through the user interface;
cause the chatbot to join the chat;
receive a second user request for a task related to the chatbot through the user interface, wherein the second user request does not include at least a part of information required for performing the task, and the at least a part of the information is stored in the at least one memory;
receive a user authorization for sharing the at least a part of the information, through the user interface, and
wherein the sharing the at least a part of the information comprises:
chatting with a personal information bot;
during the chat with the personal information bot, transmitting information relating to a first user input for chatting with the personal information bot to the personal information bot;
preventing the information relating to the first user input from being transmitted to the chatbot;
through the user interface, outputting the chat with the personal information bot, relating to the first user input; and
provide the at least a part of the information relating to a second user input made through the user interface to the chatbot, based on reception of the first user input and terminating the chat with the personal information bot.

2. The system of claim 1, wherein the user interface comprises at least one of a touchscreen display, a microphone, or a speaker,
wherein the at least one memory is configured to store a user account, and
wherein the at least a part of the information is related to the user account.

3. The system of claim 1, wherein the first electronic device comprises a first processor of the at least one processor, and
wherein the system further comprises a server including a second processor of the at least one processor.

4. The system of claim 3, wherein the instructions cause the first processor to:
receive the first user request through the user interface;
after the reception of the first user request, transmit data relating to the first user request to the server;
receive the second user request through the user interface; and
after the reception of the second user request, transmit data relating to the second user request to the server.

5. The system of claim 3, wherein the instructions cause the second processor to:
receive data relating to the first user request from the first electronic device; and
receive data relating to the second user request from the first electronic device.

6. The system of claim 3, wherein the instructions cause the second processor to:
receive the user authorization from the first electronic device; and
provide the at least a part of the information to the chatbot.

7. The system of claim 1, wherein the instructions cause the at least one processor to:
provide a third user request related to the at least a part of the information to another chatbot; while providing the third user request to the another chatbot, prevent providing of the third user request to the chatbot; and
provide the at least a part of the information to the chatbot, based on reception of the user authorization.

8. An electronic device comprising:
a communication module;
an input device;
an output device; and
at least one processor configured to:
perform a chat with a chatbot through a user interface relating to a chatting application, wherein the chat includes an operation of transmitting a message received through the input device to the chatbot through the communication module, or outputting a message received through the communication module from the chatbot, through the output device;
during the chat, detect an event for executing at least one instruction for involving a personal information bot in the chat;
during a chat with the personal information bot, transmit information relating to a first user input for chatting with the personal information bot to the personal information bot;
prevent the information relating to the first user input from being transmitted to the chatbot;
through the user interface, output the chat with the personal information bot, relating to the first user input; and
transmit information relating to a second user input made through the user interface to the chatbot, based on reception of the first user input and terminating the chat with the personal information bot.

9. The electronic device of claim 8, wherein the chat with the chatbot is performed by using a first natural-language understanding module connected to the chatbot and configured to perform a function of the chatbot,
wherein the chat with the personal information bot is performed by using a second natural-language understanding module which is configured to perform a function of the personal information bot and is different from the first natural-language understanding module, and
wherein the at least one processor is configured to detect, from the chat with the chatbot, an event for executing at least one instruction for involving the personal information bot in the chat, by using the second natural-language understanding module.

10. The electronic device of claim 8, wherein the at least one processor is configured to output a first message and a second message to be different from each other, based on information indicated by the first message and information indicated by the second message, among messages included in at least one of the chat with the chatbot or the chat with the personal information bot.

11. The electronic device of claim 8, wherein the at least one processor is configured to output a message relating to personal information, related to at least one of the chat with the chatbot or the chat with the personal information bot in personal information stored in a memory connected to the electronic device, based on detection of an event for executing at least one instruction for involving the personal information bot in the chat.

12. The electronic device of claim 8, wherein the at least one processor is configured to execute at least one instruction for involving the personal information bot in the chat, based on at least one of: identifying intent to involve the personal information bot from the chat with the chatbot; receiving a user input including a designated word in the chat with the chatbot; or receiving an input on a designated button or icon.

13. The electronic device of claim 8, wherein the at least one processor is configured to output the chat with the personal information bot, emphasized compared to the chat with the chatbot, or to output the chat with the personal information bot through a layer superimposed on a user interface to which the chat with the chatbot is output.

* * * * *